US011909661B2

(12) United States Patent
Chen

(10) Patent No.: US 11,909,661 B2
(45) Date of Patent: *Feb. 20, 2024

(54) TRAFFIC SCHEDULING METHOD, DEVICE, AND SYSTEM

(71) Applicant: Huawei Technologies Co., Ltd., Shenzhen (CN)

(72) Inventor: Lihao Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/984,765

(22) Filed: Nov. 10, 2022

(65) Prior Publication Data
US 2023/0066271 A1 Mar. 2, 2023

Related U.S. Application Data

(63) Continuation of application No. 17/193,200, filed on Mar. 5, 2021, now Pat. No. 11,570,119, which is a (Continued)

(30) Foreign Application Priority Data

Sep. 7, 2018 (CN) .......................... 201811044283.4

(51) Int. Cl.
H04L 47/60 (2022.01)
H04L 47/193 (2022.01)
(Continued)

(52) U.S. Cl.
CPC ............ H04L 47/60 (2013.01); H04L 47/193 (2013.01); H04L 47/2416 (2013.01); H04L 47/28 (2013.01); H04L 65/61 (2022.05)

(58) Field of Classification Search
CPC ... H04L 47/60; H04L 47/193; H04L 47/2416; H04L 47/28; H04L 65/4069; H04L 45/54; H04L 47/10
See application file for complete search history.

(56) References Cited

U.S. PATENT DOCUMENTS 10,862,802 B1 * 12/2020 Subramanian .......... H04L 45/24
2012/0314597 A1 12/2012 Singh et al.
(Continued)

FOREIGN PATENT DOCUMENTS

CN 103597778 A 2/2014
CN 105282213 A 1/2016
(Continued)

OTHER PUBLICATIONS

Luxi Zhao et al, Timing Analysis of AVB Traffic in TSN Networks using Network Calculus, IEEE Real-Time and Embedded Technology and Applications Symposium, 2018, 14 pages.
(Continued)

Primary Examiner — Jung H Park
(74) Attorney, Agent, or Firm — Conley Rose, P.C.

(57) ABSTRACT

A traffic scheduling method includes determining, by a first network device, first traffic scheduling information and a transmission path of a first data stream based on a first talker attribute message received from a talker device and a listener attribute message received from a listener device, and then sending, by the first network device, a first traffic scheduling message to a network device on the transmission path. The first traffic scheduling message includes the first traffic scheduling information. The first traffic scheduling information indicates the network device on the transmission path to generate a gate control list. The gate control list indicates the network device on the transmission path to
(Continued)

control, based on the gate control list, a state of a port used to transmit the first data stream.

30 Claims, 7 Drawing Sheets

Related U.S. Application Data continuation of application No. PCT/CN2019/094138, filed on Jul. 1, 2019.

(51) Int. Cl.
*H04L 47/2416* (2022.01)
*H04L 47/28* (2022.01)
*H04L 65/61* (2022.01)

(56) References Cited

U.S. PATENT DOCUMENTS

| | | | |
|---|---|---|---|
| 2013/0007288 A1 | 1/2013 | Olsen et al. | |
| 2013/0185451 A1 | 7/2013 | Gelter | |
| 2015/0365255 A1 | 12/2015 | Gunther | |
| 2018/0183708 A1* | 6/2018 | Farkas | H04L 49/30 |
| 2019/0104073 A1* | 4/2019 | Choi | H04W 72/0446 |
| 2019/0158620 A1* | 5/2019 | Oge | H04L 47/2416 |
| 2020/0389405 A1* | 12/2020 | Mardmoeller | H04L 12/40143 |

FOREIGN PATENT DOCUMENTS

| | | |
|---|---|---|
| EP | 2618537 A1 | 7/2013 |
| EP | 3217614 A1 | 9/2017 |

OTHER PUBLICATIONS

IEEE Std 802.1QTM-2018 (Revision ofIEEE Std 802.1Q-2014), "IEEE Standard for Local and Metropolitan Area Networks-Bridges and Bridged Networks," Approved May 7, 2018, 1993 pages.

IEEE Std 802.1QccTM-2018(Amendment to IEEE Std 802.1QTM-2018 as amended by IEEE Std 802.1QcpTM-2018), IEEE Standard for Local and Metropolitan Area Networks—Bridges and Bridged Networks, "Amendment 31: Stream Reservation Protocol (SRP) Enhancements and Performance Improvements," Approved Jun. 14, 2018, 208 pages.

IEEE Std 802.1ASTM-2011, IEEE Standard for Local and metropolitan area networks "Timing and Synchronization for Time-Sensitive Applications in Bridged Local Area Networks," Approved Feb. 10, 2011, 292 pages.

Kentis, A., et al., "Effects of Port Congestion in the Gate Control List Scheduling of Time Sensitive Networks," 2017 8th International Conference on the Network of the Future (NOF), Jul. 17, 2021, 3 pages.

P802.1Qbv/D3.1, Sep. 2015—IEEE Approved Draft Standard for Local and Metropolitan Area Networks—Media Access Control (MAC) Bridges and Virtual Bridged Local Area Networks Amendment: Enhancements for Scheduled Traffic, Sep. 22, 2015, 52 pages.

P802.1Qcc/D2.1, IEEE Draft Standard for Local and metropolitan area networks—Media Access Control (MAC) "Bridges and Virtual Bridged Local Area Networks Amendment: Stream Reservation Protocol (SRP) Enhancements and Performance Improvements," Feb. 15, 2018, 236 pages.

IEEE P802.1 Qcc/D2.3, "Draft Standard for Local and metropolitan area networks, Bridges and Bridged Networks, Amendment: Stream Reservation Protocol {SRP) Enhancements and Performance Improvements," May 3, 2018, 214 pages.

\* cited by examiner

| Type | Length |
|---|---|
| Enabling flag | Reserved |

FIG. 4

| Type | Length |
|---|---|
| MAC address ||
| Port ||
| Traffic scheduling enabling ||
| A quantity of timeslots in each period of a gate control list ||
| Length of a period of a gate control list ||
| Length of each timeslot of a gate control list ||
| Extension time ||
| Start time of a period of a gate control list ||
| Gate state of the gate control list ||
| Reserved ||

FIG. 5

| Type | Length |
|---|---|
| Scheduling configuration device flag ||
| MAC address ||
| Reserved ||

FIG. 6

TRAFFIC SCHEDULING METHOD, DEVICE, AND SYSTEM

CROSS-REFERENCE TO RELATED APPLICATIONS

This is a continuation of U.S. patent Ser. No. 17/193,200 filed on Mar. 5, 2021, which is a continuation of Int'l Patent App. No. PCT/CN2019/094138, filed on Jul. 1, 2019, which claims priority to Chinese Patent App. No. 201811044283.4 filed on Sep. 7, 2018, all of which are incorporated by reference.

FIELD

This application relates to the field of communications technologies, and in particular, to a traffic scheduling method, a device, and a system.

BACKGROUND

Audio video bridging (AVB) is a new Ethernet standard. An AVB-related standard is formulated by an AVB task group subordinated to the Institute of Electrical and Electronics Engineers (IEEE) 802.1 working group. The AVB task group was officially renamed the time-sensitive networking (TSN) task group in 2012. TSN mainly relates to a Stream Reservation Protocol (SRP), a Precision Time Protocol (PTP), traffic shaping, and the like. The TSN can be applied to a network scenario, for example, the audio and video transmission field, the automobile control field, the industrial control field, and the commercial electronics field, with a low latency requirement or time-based synchronous data transmission.

There are three network configuration models defined in the TSN a fully distributed model, a centralized network/distributed user model, and a fully centralized model. In the fully distributed model, there is no centralized network configuration entity, and a talker device sends network configuration information to a listener device through a transmission path for transmitting a data stream in the TSN. The transmission path for transmitting the data stream in the TSN includes at least one network device. Each of the at least one network device on the transmission path reserves a resource for transmitting the data stream based on the network configuration information. After configuration succeeds, the talker device sends the data stream to the listener device through the transmission path.

In a network scenario formed by the fully distributed model, each network device on the transmission path for transmitting the data stream can reserve the resource only based on the network configuration information exchanged between the talker device and the listener device. As a result, the talker device can send the data stream to the listener device by using only a conventional queue scheduling mechanism. However, such implementation in the fully distributed model causes a relatively high latency from the talker device to the listener device and an unstable latency.

SUMMARY

In view of this, embodiments of this application provide a traffic scheduling method, a device, and a system, to transmit enhanced scheduled traffic between a talker device and a listener device in TSN using a fully distributed model, and help reduce a latency from the talker device to the listener device and improve latency stability.

Technical solutions provided in the embodiments of this application are as follows.

According to a first aspect, a traffic scheduling method is provided. The traffic scheduling method is applied to TSN using a fully distributed model. The TSN includes a first network device, a talker device, and a listener device. The first network device, the talker device, and the listener device are configured to transmit a data stream. The method includes the following. First, the first network device receives a first talker attribute message sent by the talker device. The first talker attribute message includes a port identifier of the talker device and traffic scheduling enabling information. The traffic scheduling enabling information indicates to request the first network device to allocate first traffic scheduling information of a first data stream. The port identifier of the talker device is used to indicate an egress port of the first data stream. A first destination media access control (MAC) address included in the first talker attribute message is a MAC address of the first network device. Then, the first network device receives a listener attribute message sent by the listener device. The listener attribute message is used to indicate that the listener device is a receiving end of the first data stream. The listener attribute message includes a port identifier of the listener device. The port identifier of the listener device is used to indicate an ingress port of the first data stream. The first network device determines the first traffic scheduling information and a transmission path of the first data stream based on the first talker attribute message and the listener attribute message. The first network device sends a first traffic scheduling message to a network device on the transmission path. The first traffic scheduling message includes the first traffic scheduling information. The first traffic scheduling information is used to indicate the network device on the transmission path to generate a gate control list. The gate control list is used to indicate the network device on the transmission path to control, based on the gate control list, a state of a port used to transmit the first data stream.

According to the solution provided in this embodiment, enhanced scheduled traffic is transmitted between the talker device and the listener device in the TSN of the fully distributed model. This helps reduce a latency from the talker device to the listener device and improve latency stability. For example, the latency is at a microsecond level.

In a possible implementation of the first aspect, the first traffic scheduling information includes a first MAC address and a first port identifier. The first MAC address is used to indicate a MAC address of the network device on the transmission path. The first port identifier is used to indicate a port through which the network device on the transmission path receives the first traffic scheduling message.

In still another possible implementation of the first aspect, before the first network device receives a first talker attribute message sent by the talker device, the method further includes the following. The first network device receives a MAC address request message sent by a neighboring network device of the first network device. The MAC address request message is used to obtain the MAC address of the first network device. The first network device sends a MAC address reply message to the neighboring network device of the first network device based on the MAC address request message. The MAC address reply message carries the MAC address of the first network device.

In yet another possible implementation of the first aspect, that the first network device determines the first traffic scheduling information based on the first talker attribute message and the listener attribute message specifically includes the following. The first network device determines, based on the listener attribute message, that the listener device is capable of receiving the first data stream. The first network device determines, based on the traffic scheduling enabling information and the first destination MAC address that are included in the first talker attribute message, that the first talker attribute message is used to request the first network device to allocate the first traffic scheduling information of the first data stream. The first network device determines the first traffic scheduling information and the transmission path based on the first talker attribute message and the port identifier of the listener device.

In yet another possible implementation of the first aspect, the method further includes the following. The first network device forwards the listener attribute message to the talker device.

In yet another possible implementation of the first aspect, before the first network device receives a listener attribute message sent by the listener device, the method further includes the following. The first network device receives a second talker attribute message sent by the talker device. The second talker attribute message indicates to request the listener device to receive the first data stream. The second talker attribute message includes the traffic scheduling enabling information and a second destination MAC address. The second destination MAC address is a MAC address of the listener device. The first network device skips reserving, based on the traffic scheduling enabling information included in the second talker attribute message, a resource for transmitting the first data stream. The first network device forwards the second talker attribute message to the listener device.

According to a second aspect, a traffic scheduling method is provided. The traffic scheduling method is applied to TSN using a fully distributed model. The TSN includes a first network device, a second network device, and a listener device. The first network device, the second network device, and the listener device are configured to transmit a data stream. The method includes the following. First, the second network device receives a first traffic scheduling message sent by the first network device. The first traffic scheduling message includes first traffic scheduling information. The first traffic scheduling information is traffic scheduling information determined by the first network device based on a first talker attribute message and a listener attribute message. The first talker attribute message includes a port identifier of a talker device and traffic scheduling enabling information. The traffic scheduling enabling information indicates to request the first network device to allocate the first traffic scheduling information of a first data stream. The port identifier of the talker device is used to indicate an egress port of the first data stream. A first destination MAC address included in the first talker attribute message is a MAC address of the first network device. The listener attribute message is used to indicate that the listener device is a receiving end of the first data stream. The listener attribute message includes a port identifier of the listener device. The port identifier of the listener device is used to indicate an ingress port of the first data stream. Then, the second network device generates a gate control list based on the first traffic scheduling information. The second network device controls, based on the gate control list, a state of a port used to transmit the first data stream.

According to the solution provided in this embodiment, enhanced scheduled traffic is transmitted between the talker device and the listener device in the TSN of the fully distributed model. This helps reduce a latency from the talker device to the listener device and improve latency stability. For example, the latency is at a microsecond level.

In a possible implementation of the second aspect, before the second network device receives a first traffic scheduling message sent by the first network device, the method further includes the following. The second network device receives a second talker attribute message sent by the talker device. The second talker attribute message indicates to request the listener device to receive the first data stream. The second talker attribute message includes the traffic scheduling enabling information and a second destination MAC address. The second destination MAC address is a MAC address of the listener device. The second network device skips reserving, based on the traffic scheduling enabling information included in the second talker attribute message, a resource for transmitting the first data stream. The first network device forwards the second talker attribute message to the listener device.

In still another possible implementation of the second aspect, the method further includes the following. The second network device generates the first talker attribute message based on the second talker attribute message. A payload of the second talker attribute message is the same as a payload of the first talker attribute message. The second network device sends the first talker attribute message to the first network device.

In yet another possible implementation of the second aspect, the second network device is the talker device. Before the second network device receives a first traffic scheduling message sent by the first network device, the method further includes the following. The second network device sends the first talker attribute message to the first network device. The second network device sends a second talker attribute message to the listener device. The second talker attribute message indicates to request the listener device to receive the first data stream. The second talker attribute message includes the traffic scheduling enabling information and a second destination MAC address. The second destination MAC address is a MAC address of the listener device. The second network device receives the listener attribute message that is sent by the listener device and forwarded by the first network device.

In yet another possible implementation of the second aspect, before the second network device sends the first talker attribute message to the first network device, the method further includes the following. The second network device sends a MAC address request message to a neighboring network device of the second network device. The MAC address request message is used to obtain the MAC address of the first network device. The second network device receives a MAC address reply message sent by the neighboring network device of the second network device. The MAC address reply message carries the MAC address of the first network device.

According to a third aspect, a traffic scheduling method is provided. The traffic scheduling method is applied to TSN using a fully distributed model. The TSN includes a talker device and a listener device. The talker device and the listener device are configured to transmit a data stream. The method includes the following. First, the talker device determines a first talker attribute. The first talker attribute includes a port identifier of the talker device and traffic scheduling enabling information. The traffic scheduling enabling information indicates to request the talker device to allocate first traffic scheduling information of a first data stream. The port identifier of the talker device is used to indicate an egress port of the first data stream. Then, the talker device receives a listener attribute message sent by the listener device. The listener attribute message is used to indicate that the listener device is a receiving end of the first data stream. The listener attribute message includes a port identifier of the listener device. The port identifier of the listener device is used to indicate an ingress port of the first data stream. The talker device determines the first traffic scheduling information and a transmission path of the first data stream based on the first talker attribute and the listener attribute message. The talker device sends a first traffic scheduling message to a network device on the transmission path. The first traffic scheduling message includes the first traffic scheduling information. The first traffic scheduling information indicates the network device on the transmission path to generate a gate control list. The gate control list indicates the network device on the transmission path to control, based on the gate control list, a state of a port used to transmit the first data stream.

According to the solution provided in this embodiment, enhanced scheduled traffic is transmitted between the talker device and the listener device in the TSN of the fully distributed model. This helps reduce a latency from the talker device to the listener device and improve latency stability. For example, the latency is at a microsecond level.

In a possible implementation of the third aspect, the first traffic scheduling information includes a first MAC address and a first port identifier. The first MAC address is used to indicate a MAC address of the network device on the transmission path. The first port identifier is used to indicate a port through which the network device on the transmission path receives the first traffic scheduling message.

In still another possible implementation of the third aspect, that the talker device determines the first traffic scheduling information based on the first talker attribute and the listener attribute message specifically includes the following. The talker device determines, based on the listener attribute message, that the listener device is capable of receiving the first data stream. The talker device determines, based on the traffic scheduling enabling information included in the first talker attribute message, that the first talker attribute message is used to request the talker device to allocate the first traffic scheduling information of the first data stream. The talker device determines the first traffic scheduling information and the transmission path based on the first talker attribute and the port identifier of the listener device.

In yet another possible implementation of the third aspect, before the talker device receives a listener attribute message sent by the listener device, the method further includes the following. The talker device sends a second talker attribute message to the listener device. The second talker attribute message indicates to request the listener device to receive the first data stream. The second talker attribute message includes the traffic scheduling enabling information and a second destination MAC address. The second destination MAC address is a MAC address of the listener device.

In the first aspect, the second aspect, or the third aspect, optionally, the first traffic scheduling information further includes a start time of a period of the gate control list and a gate state of the gate control list. The first traffic scheduling information further includes at least two pieces of the following information a quantity of timeslots in each period of the gate control list, a length of the period of the gate control list, and a length of a timeslot of the gate control list.

In the first aspect, the second aspect, or the third aspect, optionally, the first traffic scheduling information further includes time extension information. The time extension information is used to indicate an extension time of currently effective traffic scheduling information before the first traffic scheduling information takes effect.

In the first aspect, the second aspect, or the third aspect, optionally, the first traffic scheduling message is a Multiple Registration Protocol (MRP) message or a Link-local Registration Protocol (LRP) message.

According to a fourth aspect, a first network device is provided. The first network device has a function of implementing behavior of the first network device in the foregoing methods. The function may be implemented based on hardware, or may be implemented based on hardware executing corresponding software. The hardware or the software includes one or more modules corresponding to the foregoing function.

In a possible design, a structure of the first network device includes a processor and an interface. The processor is configured to support the first network device in performing the corresponding function in the foregoing methods. The interface is configured to support communication between the first network device, a second network device, a talker device, or a listener device, and send information or instructions in the foregoing methods to the second network device, the talker device, or the listener device, or receive information or instructions in the foregoing methods from the second network device, the talker device, or the listener device. The first network device may further include a memory. The memory is configured to be coupled to the processor, and the memory stores a program instruction and data that are necessary for the first network device.

In another possible design, the first network device includes a processor, a transmitter, a receiver, a random-access memory (RAM), a read-only memory (ROM), and a bus. The processor is separately coupled to the transmitter, the receiver, the RAM, and the ROM through the bus. When the first network device needs to run, a bootloader in a basic input/output system (BIOS) or an embedded system that is built into the ROM is used to boot a system to start, and boot the first network device to enter a normal running state. After entering the normal running state, the first network device runs an application program and an operating system in the RAM, so that the processor performs the method in any one of the first aspect or the possible implementations of the first aspect.

According to a fifth aspect, a first network device is provided. The first network device includes a main control board and an interface board, and may further include a switching board. The first network device is configured to perform the method in any one of the first aspect or the possible implementations of the first aspect. Specifically, the first network device includes a module configured to perform the method in any one of the first aspect or the possible implementations of the first aspect.

According to a sixth aspect, a first network device is provided. The first network device includes a controller and a first forwarding sub-device. The first forwarding sub-device includes an interface board, and may further include a switching board. The first forwarding sub-device is configured to perform a function of the interface board in the fifth aspect, and may further perform a function of the switching board in the fifth aspect. The controller includes a receiver, a processor, a transmitter, a RAM, a ROM, and a bus. The processor is separately coupled to the receiver, the transmitter, the RAM, and the ROM through the bus. When the controller needs to run, a bootloader in a BIOS or an embedded system that is built into the ROM is used to boot a system to start, and boot the controller to enter a normal running state. After entering the normal running state, the controller runs an application program and an operating system in the RAM, so that the processor performs a function of the main control board in the fifth aspect.

According to a seventh aspect, a computer storage medium is provided. The computer storage medium is configured to store a program, code, or an instruction used by the foregoing first network device. When executing the program, the code, or the instruction, a processor or a hardware device may complete functions or steps of the first network device in the first aspect.

According to an eighth aspect, a second network device is provided. The second network device has a function of implementing behavior of the second network device in the foregoing methods. The function may be implemented based on hardware, or may be implemented based on hardware executing corresponding software. The hardware or the software includes one or more modules corresponding to the foregoing function.

In a possible design, a structure of the second network device includes a processor and an interface. The processor is configured to support the second network device in performing a corresponding function in the foregoing methods. The interface is configured to support communication between the second network device and a first network device, and send information or instructions in the foregoing methods to the first network device, or receive information or instructions in the foregoing methods from the first network device. The second network device may further include a memory. The memory is configured to be coupled to the processor, and the memory stores a program instruction and data that are necessary for the second network device.

In another possible design, the second network device includes a processor, a transmitter, a receiver, a RAM, a ROM, and a bus. The processor is separately coupled to the transmitter, the receiver, the RAM, and the ROM through the bus. When the second network device needs to run, a bootloader in a BIOS or an embedded system that is built into the ROM is used to boot a system to start, and boot the second network device to enter a normal running state. After entering the normal running state, the second network device runs an application program and an operating system in the RAM, so that the processor performs the method in any one of the second aspect or the possible implementations of the second aspect.

According to a ninth aspect, a second network device is provided. The second network device includes a main control board and an interface board, and may further include a switching board. The second network device is configured to perform the method in any one of the second aspect or the possible implementations of the second aspect. Specifically, the second network device includes a module configured to perform the method in any one of the second aspect or the possible implementations of the second aspect.

According to a tenth aspect, a second network device is provided. The second network device includes a controller and a second forwarding sub-device. The second forwarding sub-device includes an interface board, and may further include a switching board. The second forwarding sub-device is configured to perform a function of the interface board in the ninth aspect, and may further perform a function of the switching board in the ninth aspect. The controller includes a receiver, a processor, a transmitter, a RAM, a ROM, and a bus. The processor is separately coupled to the receiver, the transmitter, the RAM, and the ROM through the bus. When the controller needs to run, a bootloader in a BIOS or an embedded system that is built into the ROM is used to boot a system to start, and boot the controller to enter a normal running state. After entering the normal running state, the controller runs an application program and an operating system in the RAM, so that the processor performs a function of the main control board in the ninth aspect.

According to an eleventh aspect, a computer storage medium is provided and is configured to store a program, code, or an instruction used by the foregoing second network device. When executing the program, the code, or the instruction, a processor or a hardware device may complete functions or steps of the second network device in the foregoing second aspect.

According to a twelfth aspect, a talker device is provided. The talker device has a function of implementing behavior of the talker device in the method in the third aspect. The function may be implemented based on hardware, or may be implemented based on hardware executing corresponding software. The hardware or the software includes one or more modules corresponding to the foregoing function.

In a possible design, a structure of the talker device includes a processor and an interface. The processor is configured to support the talker device in performing corresponding functions in the foregoing methods. The interface is configured to support communication between the talker device and a second network device or a listener device, and send information or instructions in the foregoing methods to the second network device or the listener device, or receive information or instructions in the foregoing methods from the second network device, the talker device, or the listener device. The talker device may further include a memory. The memory is configured to be coupled to the processor, and the memory stores a program instruction and data that are necessary for the talker device.

In another possible design, the talker device includes a processor, a transmitter, a receiver, a RAM, a ROM, and a bus. The processor is separately coupled to the transmitter, the receiver, the RAM, and the ROM through the bus. When the talker device needs to run, a bootloader in a BIOS or an embedded system that is built into the ROM is used to boot a system to start, and boot the talker device to enter a normal running state. After entering the normal running state, the talker device runs an application program and an operating system in the RAM, so that the processor performs the method in any one of the third aspect or the possible implementations of the third aspect.

According to a thirteenth aspect, a talker device is provided. The talker device includes a main control board and an interface board, and may further include a switching board. The talker device is configured to perform the method in any one of the third aspect or the possible implementations of the third aspect. Specifically, the talker device includes a module configured to perform the method in any one of the third aspect or possible implementations of the third aspect.

According to a fourteenth aspect, a talker device is provided. The talker device includes a controller and a first forwarding sub-device. The first forwarding sub-device includes an interface board, and may further include a switching board. The first forwarding sub-device is configured to perform a function of the interface board in the thirteenth aspect, and may further perform a function of the switching board in the thirteenth aspect. The controller includes a receiver, a processor, a transmitter, a RAM, a ROM, and a bus. The processor is separately coupled to the receiver, the transmitter, the RAM, and the ROM through the bus. When the controller needs to run, a bootloader in a BIOS or an embedded system that is built into the ROM is used to boot a system to start, and boot the controller to enter a normal running state. After entering the normal running state, the controller runs an application program and an operating system in the RAM, so that the processor performs a function of the main control board in the thirteenth aspect.

According to a fifteenth aspect, a computer storage medium is provided and is configured to store a program, code, or an instruction used by the foregoing talker device. When executing the program, the code, or the instruction, a processor or a hardware device may complete functions or steps of the talker device in the third aspect.

According to a sixteenth aspect, a network system is provided. The network system includes a first network device and a second network device. The first network device is the first network device in the fourth aspect, the fifth aspect, or the sixth aspect. The second network device is the second network device in the eighth aspect, the ninth aspect, or the tenth aspect.

According to the foregoing solutions, in the TSN of the fully distributed model, the first network device configured to transmit the data stream determines the first traffic scheduling information and the transmission path of the first data stream based on the first talker attribute message received from the talker device and the listener attribute message received from the listener device. The first network device sends the first traffic scheduling message including the first traffic scheduling information to the network device on the transmission path. After receiving the first traffic scheduling message, the network device on the transmission path generates the gate control list based on the first traffic scheduling information, and controls, based on the gate control list, the state of the port used to transmit the first data stream. According to the method provided in the embodiments, the enhanced scheduled traffic is transmitted between the talker device and the listener device. This helps reduce the latency from the talker device to the listener device and improve the latency stability.

BRIEF DESCRIPTION OF THE DRAWINGS

FIG. 4 is a diagram of an encapsulation format of traffic scheduling enabling information according to an embodiment of this application.

FIG. 5 is a diagram of an encapsulation format of first traffic scheduling information according to an embodiment of this application.

FIG. 6 is a diagram of an encapsulation format of MAC address information of a first network device according to an embodiment of this application.

DETAILED DESCRIPTION

The following separately provides detailed descriptions by using specific embodiments.

Figure 1:
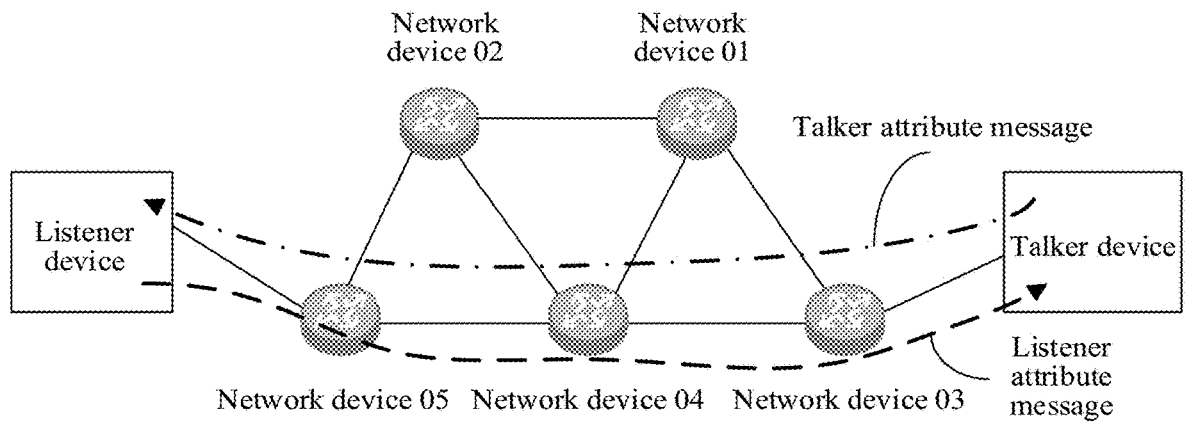
FIG. 1 is a schematic diagram of a structure of a network according to an embodiment of this application.

FIG. 1 is a schematic diagram of a structure of a network according to an embodiment of this application. The network shown in FIG. 1 is TSN of a fully distributed model. The network includes a talker device, a listener device, and at least one network device. The at least one network device is located on a transmission path between the talker device and the listener device. As shown in FIG. 1, the talker device communicates with the listener device by using a network device 01, a network device 02, a network device 03, a network device 04, a network device 05, and a network device 06. For a network architecture of the TSN of the fully distributed model, refer to related explanations in "section 46: time-sensitive networking (TSN) configuration" in IEEE P80v2.1Qcc/D2.1.

In the network shown in FIG. 1, the talker device and the listener device may be referred to as end stations in the TSN. The network device 01 to the network device 06 may be referred to as transmission devices in the TSN. In a layer-2 network scenario, the network device 01 to the network device 06 include bridges. In an actual scenario, the talker device and the listener device may also be considered as bridges. For example, the talker device is a bridge for sending a data stream, and the listener device is a bridge for receiving a data stream. Specifically, the network device 01 to the network device 06 include switches. The talker device and the listener device include switches or servers. In a layer-3 network scenario, the network device 01 to the network device 06 include routers or layer-3 switches. The talker device and the listener device include routers, layer-3 switches, or servers.

In the network shown in FIG. 1, the talker device may send a data stream to the listener device through a transmission network formed by the network device 01 to the network device 06. For example, the talker device sends a data stream 01 to the listener device by using the network device 03, the network device 04, and the network device 05. A path passing through the talker device, the network device 03, the network device 04, the network device 05, and the listener device is a transmission path of the data stream 01. Before transmitting the data stream 01, the talker device may send a requirement for transmitting the data stream 01 to the listener device through the transmission path of the data stream 01 according to an SRP specification. The listener device determines whether the network devices and the listener device on the transmission path of the data stream 01 are capable of forwarding the data stream 01. The listener device sends a determining result to the talker device in an inverse direction of the transmission path of the data stream 01. The talker device determines, based on the determining result, whether to send the data stream 01 to the listener device.

For example, the talker device generates a talker attribute. The talker attribute is used to indicate the requirement for sending and transmitting the data stream 01 by the talker device. The talker device carries the talker attribute in a talker attribute message (as shown by a "dash-dot line" in FIG. 1). Then, the talker device sends the talker attribute message to the listener device along the transmission path of the data stream 01. The network device 03, the network device 04, and the network device 05 on the transmission path of the data stream 01 process and forward the talker attribute message according to the SRP specification. Specifically, after receiving the talker attribute message, the network device 03 reserves, based on the requirement in the talker attribute message, a resource for forwarding the data stream 01. If the network device 03 has sufficient resources for transmitting the data stream 01, the network device 03 reserves the resource for the data stream 01, and inserts a resource reservation success flag into the talker attribute message. In this way, a talker attribute message inserted with the resource reservation success flag carries a talker advertise vector attribute. If the network device 03 does not have sufficient resources for transmitting the data stream 01, the network device 03 inserts a resource reservation failure flag into the talker attribute message. In this way, a talker attribute message inserted with the resource reservation failure flag carries a talker failed vector attribute. Correspondingly, the network device 04 and the network device 05 perform operations similar to those performed by the network device 03. After receiving the talker attribute message, the listener device may determine, based on talker advertise vector attributes or talker failed vector attributes carried in the talker attribute message, whether the network device 03, the network device 04, and the network device 05 on the transmission path of the data stream 01 successfully reserve resources. If the listener device determines that the network device 03, the network device 04, and the network device 05 successfully reserve the resources, and the listener device determines that the listener device is capable of receiving the data stream 01, the listener device sends, along an original path of the talker attribute message, a listener attribute message (shown by a "dotted line" in FIG. 1) carried with listener ready information to the talker device. If the listener device determines that any one of the network device 03, the network device 04, and the network device 05 fails to reserve a resource, the listener device sends, along an original path of the talker attribute message, a listener attribute message carried with listener asking failed information to the talker device (as shown by the "dotted line" in FIG. 1). After the talker device receives the listener attribute message carried with the listener ready information, the talker device starts to send the data stream 01 to the listener device through the transmission path of the data stream 01.

In the foregoing manner, in the TSN of the fully distributed model, according to the SRP specification, the network device on the transmission path of the data stream determines the reserved resource based on the requirement in the talker attribute and a forwarding capability of the network device, to transmit the data stream. The "resource" mentioned in this implementation of this application includes a bandwidth. In the foregoing implementation, the talker attribute message sent by the talker device may be sent to a plurality of listener devices in a multicast manner. Each listener device may determine, in the foregoing implementation, whether the listener device is capable of receiving the data stream. The talker attribute message and the listener attribute message mentioned in the foregoing implementation may be SRP messages. An SRP mainly includes a multiple MAC registration protocol (MMRP), a multiple virtual local access network (VLAN) registration protocol (MVRP), and a multiple stream registration protocol (MSRP). The MSRP is used as an example for discussion in this implementation of this application. For the SRP, the MSRP, the talker attribute, and the listener attribute mentioned in the foregoing implementation, refer to related explanations in "section 35: stream reservation protocol (SRP)" in IEEE P802.1Qcc/D2.1 and IEEE Std 802.1Q-2018.

In the foregoing implementation, the network device on the transmission path of the data stream reserves, based on a bandwidth occupation state of the network device, a bandwidth that meets the requirement in the talker attribute. Specifically, the requirement in the talker attribute may include a time interval for forwarding a data frame included in the data stream, a maximum quantity of data frames forwarded within the time interval, a maximum length of the data frame, and the like. The network device on the transmission path of the data stream determines the reserved bandwidth based on the requirement in the talker attribute. However, in the TSN of the fully distributed model, when reserving the resource, the network device on the transmission path of the data stream reserves only based on the forwarding capability of the network device, and does not consider a forwarding capability of the entire transmission path for transmitting the data stream. Therefore, in the TSN of the fully distributed model, a latency from the talker device to the listener device is relatively high. For example, the latency is at a millisecond level. In addition, the foregoing implementation also causes an unstable latency.

Figure 2:
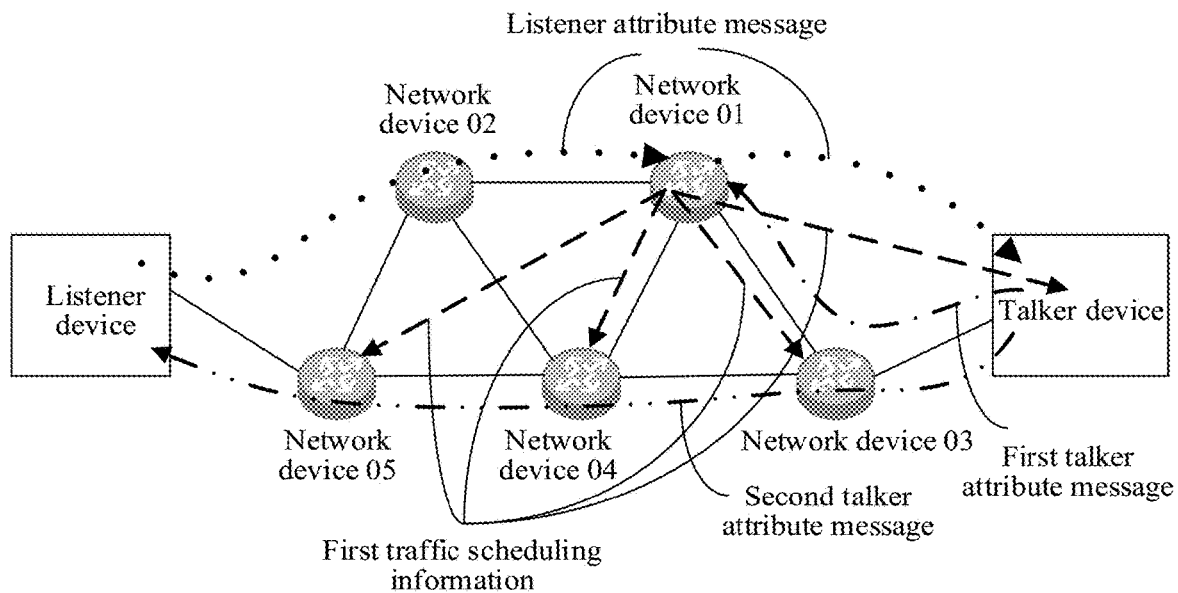
FIG. 2 is a schematic diagram of a structure of another network according to an embodiment of this application.

Embodiments of this application provide a traffic scheduling method, a device, and a system, to transmit enhanced scheduled traffic between a talker device and a listener device in TSN using a fully distributed model, and help reduce a latency from the talker device to the listener device and improve latency stability. For example, the latency is at a microsecond level. FIG. 2 is a structural diagram of TSN using a fully distributed model according to an embodiment of this application. A network structure shown in FIG. 2 is the same as the network structure in FIG. 1. Therefore, for descriptions of the network structure in FIG. 2, refer to the foregoing descriptions in the embodiments of this application. Details are not described herein again.

The TSN of the fully distributed model shown in FIG. 2 includes a network device that can implement a traffic scheduling configuration function, to transmit an enhanced scheduled traffic between a talker device and a listener device. The network device for implementing the traffic scheduling configuration function may be any network device between the talker device and the listener device, used to transmit a data stream, or may be a talker device. In FIG. 2, a network device 01 is used as an example for description.

For example, the talker sends a data stream 01 to the listener device by using a network device 03, a network device 04, and a network device 05. A path passing through the talker device, the network device 03, the network device 04, the network device 05, and the listener device is a transmission path of the data stream 01. Before the talker device sends the data stream 01, the talker device sends a first talker attribute message (as shown in FIG. 2) to the network device 01. The first talker attribute message is used to request the network device 01 to allocate first traffic scheduling information for transmitting the data stream 01. The talker device further sends a second talker attribute message (as shown in FIG. 2) to the listener device along the transmission path of the data stream 01. The second talker attribute message indicates to request the listener device to receive the data stream 01. To save bandwidth resources of network devices on the transmission path of the data stream 01, after receiving the second talker attribute message, the network device 03, the network device 04, and the network device 05 skip reserving resources for transmitting the first data stream 01. In other words, the network device 03, the network device 04, and the network device 05 do not process the second talker attribute message based on the implementation in FIG. 1, but the network device 03, the network device 04, and the network device 05 forward the second talker attribute message to the listener device. When the listener device determines, based on the second talker attribute message, that the listener device is capable of receiving the data stream 01, the listener device sends a listener attribute message (as shown in FIG. 2) to the network device 01. The network device 01 determines the first traffic scheduling information and the transmission path of the data stream 01 based on the first talker attribute message and the listener attribute message. Then, the network device 01 sends a first traffic scheduling message (as shown in FIG. 2) including the first traffic scheduling information to the network device 03, the network device 04, the network device 05, and the talker device. The network device on the transmission path of the data stream 01 may generate a gate control list based on the first traffic scheduling information, to control, based on the gate control list, a state of a port used to transmit the data stream 01.

In the foregoing implementation, the network device transmitting the data stream in the TSN of the fully distributed model implements the traffic scheduling configuration function, to transmit the enhanced scheduled traffic between the talker device and the listener device, and help reduce a latency from the talker device to the listener device and improve latency stability. For a definition of the enhanced scheduled traffic, refer to descriptions in IEEE P802.1Qbv/D3.1. Correspondingly, for an implementation in which the network device transmitting the data stream in the TSN of the fully distributed model implements the traffic scheduling configuration function, refer to descriptions of subsequent implementations.

Figure 3:
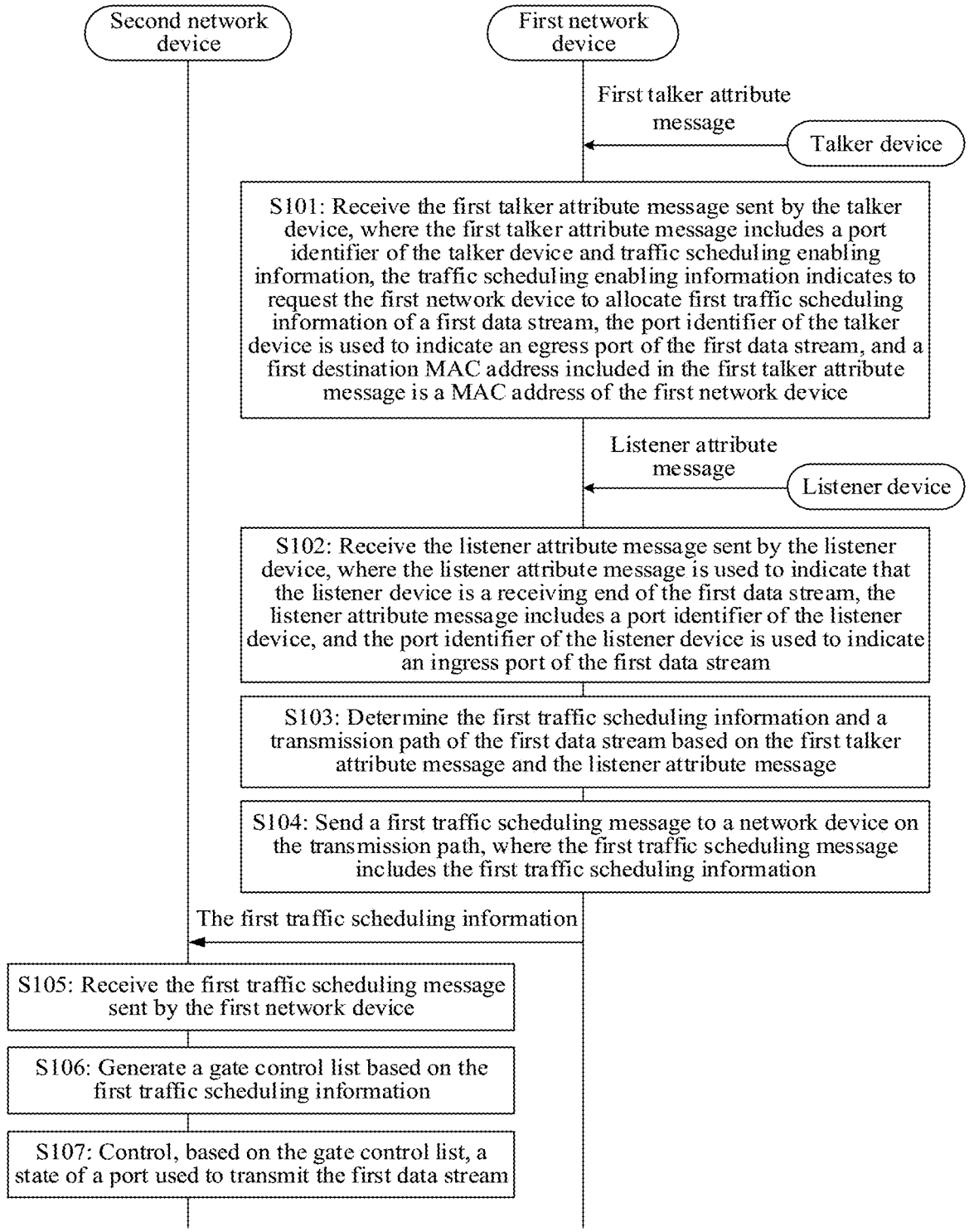
FIG. 3 is a flowchart of a traffic scheduling method according to an embodiment of this application.

FIG. 3 is a flowchart of a traffic scheduling method according to an embodiment of this application. The method shown in FIG. 3 may be applied to the network structure shown in FIG. 2. Specifically, the traffic scheduling method is applied to TSN using a fully distributed model, the TSN includes a first network device. The first network device is configured to transmit a data stream. The method includes the following steps.

S101. The first network device receives a first talker attribute message sent by a talker device, where the first talker attribute message includes a port identifier of the talker device and traffic scheduling enabling information, the traffic scheduling enabling information indicates to request the first network device to allocate first traffic scheduling information of a first data stream, the port identifier of the talker device is used to indicate an egress port of the first data stream, and a first destination MAC address included in the first talker attribute message is a MAC address of the first network device.

With reference to the descriptions of the foregoing implementation, the first network device may be used as the network device implementing the traffic scheduling configuration function in the TSN of the fully distributed model. The first network device may be any network device configured to forward the data stream in the TSN, or the first network device is a talker device. Optionally, the first network device may be determined according to a shortest path principle. For example, a sum of paths from the first network device to other network devices in the TSN is less than a sum of paths from any network device other than the first network device in the TSN to other network devices in the TSN.

For example, refer to FIG. 2, the network device 01 is the first network device in this embodiment. In addition, according to the foregoing descriptions, the talker device sends the first data stream to the listener device by using the network device 03, the network device 04, and the network device 05. Before sending the first data stream, the talker device needs to determine whether the listener device can receive the first data stream. The talker device generates the first talker attribute message. The first talker attribute message includes the first talker attribute. The first talker attribute includes a port identifier of the talker device and traffic scheduling enabling information. In this implementation of this application, the first talker attribute message may be used to trigger the network device 01 to implement the traffic scheduling configuration function, to transmit enhanced scheduled traffic between the talker device and the listener device in the TSN of the fully distributed model.

The port identifier of the talker device is used to indicate the egress port of the first data stream. In other words, the talker device may send the first data stream through the egress port. For example, the talker device includes a port 01, a port 02, and a port 03. The talker device sends the first data stream through the port 01. Therefore, the port 01 is the egress port of the first data stream. The port identifier may include a port number or a MAC address of the port.

The traffic scheduling enabling information is used to request the network device 01 to deliver the first traffic scheduling information to the network device transmitting the first data stream. FIG. 4 shows an implementation of the traffic scheduling enabling information. Specifically, the traffic scheduling enabling information may be implemented based on a type-length-value (TLV) encapsulation format. For example, a value of a type field is set to 22. A value of a length field is set to 1 byte. A length of an enabling flag field is set to 1 bit. A length of a reserved field is set to 7 bits. When the value of the enabling flag field is 1, it indicates that a traffic scheduling function is enabled. In other words, the talker device sends the traffic scheduling enabling information carried with the enabling flag field whose value is 1, to request the network device 01 to deliver the first traffic scheduling information to the network device transmitting the first data stream. When the value of the enabling flag field is 0, it indicates that a traffic scheduling function is not enabled. The talker device sends the traffic scheduling enabling information carried with the enabling flag field whose value is 0, to request to reserve a resource according to the implementation shown in FIG. 1.

The first talker attribute message further includes a first destination MAC address. The first destination MAC address is a MAC address of the network device 01. Specifically, the first destination MAC address may be carried in a packet header of the first talker attribute message, so that the network device 01 may receive the first talker attribute message.

As shown in FIG. 2, after the talker device sends the first talker attribute message, the first talker attribute message is forwarded by the network device 03 to the network device 01. The first talker attribute message may be specifically implemented according to an SRP. Therefore, the first talker attribute message may be referred to as an SRP message. The first talker attribute message may be specifically implemented according to an MSRP. Therefore, the first talker attribute message may be referred to as an MSRP message. A first talker attribute in the first talker attribute message further includes a stream identifier (StreamID) field, a stream rank (StreamRank) field, and a traffic specification (TrafficSpecification) field. The stream identifier field is used to indicate a data stream. Different data streams have different stream identifiers. The stream rank field is used to indicate a rank of a data stream. A value of the stream rank field may be determined based on at least one piece of the following information stream identifier information, priority information, and VLAN identifier information. The stream rank field is associated with traffic class information in a gate control list. The traffic class information is used to identify a class of a stream queue. The traffic specification field is used to indicate a requirement and a specification for transmitting a data stream in TSN. The traffic specification field may include at least one piece of the following information interval information, max frames per interval (MaxFramesPerInterval) information, max frame size (MaxFrameSize) information, and transmission selection (TransmissionSelection) information. For example, in the implementation shown in FIG. 2, a traffic specification field in the first talker attribute message includes interval information, max frames per interval information, and max frame size information. Optionally, the first talker attribute in the first talker attribute message may further include a traffic specification time description (TSpecTimeAware) field. The traffic specification time description includes earliest transmission offset (EarliestTransmitOffset) information, latest transmission offset (LatestTransmitOffset) information and jitter (Jitter) information. Optionally, the first talker attribute in the first talker attribute message may further include a user to network requirements (UserToNetworkRequirements) field. For explanations about the stream identifier field, the stream rank field, the traffic specification field, the traffic specification time description field, and the user to network requirements field in this implementation of this application, refer to descriptions in section 35 and section 46 in IEEE P802.1Qcc/D2.1.

Optionally, the talker device sends a second talker attribute message to the listener device. The second talker attribute message is used to indicate to request the listener device to receive the first data stream. The second talker attribute message includes the traffic scheduling enabling information and a second destination MAC address. The second destination MAC address is a MAC address of the listener device.

For example, as shown in FIG. 2, according to the foregoing descriptions, the talker device sends the first data stream to the listener device by using the network device 03, the network device 04, and the network device 05. The talker device may send the second talker attribute message to the listener device along the transmission path of the first data stream. The second talker attribute message indicates to request the listener device to receive the first data stream. The second talker attribute message includes a second talker attribute. The second talker attribute includes the traffic scheduling enabling information. The network device on the transmission path of the first data stream may determine a specific operation based on the traffic scheduling enabling information. For an implementation in which the network device on the transmission path of the first data stream determines the specific operation based on the traffic scheduling enabling information, refer to subsequent descriptions of implementations of this application. The second talker attribute message further includes a second destination MAC address. The second destination MAC address is a MAC address of the listener device, so that the listener device can receive the second talker attribute message. Specifically, the second destination MAC address is carried in a packet header of the second talker attribute message. The second talker attribute message may be an SRP message, and may be specifically an MSRP message.

S102. The first network device receives a listener attribute message sent by the listener device, where the listener attribute message is used to indicate that the listener device is a receiving end of the first data stream, the listener attribute message includes a port identifier of the listener device, and the port identifier of the listener device is used to indicate an ingress port of the first data stream.

For example, with reference to the foregoing descriptions, after receiving the second talker attribute message, the listener device determines whether the listener device is capable of receiving the first data stream based on the second talker attribute message, and generates the listener attribute message. According to the foregoing descriptions, if the listener device determines that the first data stream can be received, the listener device generates the listener attribute message carried with the listener ready information. If the listener device determines that the first data stream cannot be received, the listener device generates the listener attribute message carried with the listener asking failed information. In addition, the listener device further determines, based on the traffic scheduling enabling information in the second talker attribute message, to send the listener attribute message to which network device. Specifically, with reference to the foregoing descriptions, if the value of the enabling flag in the traffic scheduling enabling information is 1, it indicates that the traffic scheduling function is enabled. The listener device sends the listener attribute message (as shown in FIG. 2) to the network device 01. If the value of the enabling flag in the traffic scheduling enabling information is 0, it indicates that the traffic scheduling function is not enabled. The listener device sends the listener attribute message to the talker device. The listener attribute message may be an SRP message, and may be specifically an MSRP message. The listener attribute message may be a unicast message or a broadcast message.

The network device 01 receives, by using the network device 02, the listener attribute message sent by the listener device. The listener attribute message is used to indicate that the listener device is a receiving end of the first data stream. The listener attribute message further includes a port identifier of the listener device. The port identifier of the listener device is used to indicate an ingress port of the first data stream. In other words, the listener device may receive the first data stream through the ingress port.

Optionally, the first network device forwards the listener attribute message to the talker device.

For example, as shown in FIG. 2, after receiving the listener attribute message, the network device 01 further forwards the listener attribute message to the talker device. In this way, the talker device may determine, based on the listener attribute message, whether the listener device is capable of receiving the first data stream. It should be noted that the operation in which the network device 01 forwards the listener attribute message to the talker device is not mandatory. The talker device may receive a first traffic scheduling message sent by the network device 01. The talker device may determine, based on the first traffic scheduling message, whether the listener device is capable of receiving the first data stream.

S103. The first network device determines the first traffic scheduling information and a transmission path of the first data stream based on the first talker attribute message and the listener attribute message.

For example, after receiving the first talker attribute message from the talker device and the listener attribute message from the listener device, the network device 01 generates the first traffic scheduling information based on the first talker attribute message and the listener attribute message and determines a transmission path of the first data stream. Optionally, an implementation of the step S103 may be implemented according to implementations of steps S1031 to S1033.

S1031. The first network device determines, based on the listener attribute message, that the listener device is capable of receiving the first data stream.

For example, according to the foregoing descriptions, the network device 01 may receive the listener attribute message carried with the listener ready information. Therefore, the network device 01 determines, based on the listener ready information, that the listener device is capable of receiving the first data stream.

S1032. The first network device determines, based on the traffic scheduling enabling information and the first destination MAC address that are included in the first talker attribute message, that the first talker attribute message is used to request the first network device to allocate the first traffic scheduling information of the first data stream.

For example, according to the foregoing descriptions, the value of the enabling flag in the traffic scheduling enabling information included in the first talker attribute message is 1, it indicates that the traffic scheduling function is enabled. The first destination MAC address included in the first talker attribute message is the MAC address of the network device 01. The network device 01 may determine, based on the first destination MAC address and the traffic scheduling enabling information, that the first talker attribute message is a talker attribute message that is sent by the talker device to the network device 01 and that is used to request the network device 01 to allocate the first traffic scheduling information of the first data stream. In other words, the network device 01 may determine, in the foregoing manner, that the received talker attribute message is not the second talker attribute message mentioned above.

S1033. The first network device determines the first traffic scheduling information and the transmission path based on the first talker attribute message and the port identifier of the listener device.

For example, according to the foregoing descriptions, the first talker attribute message carries the port identifier of the talker device. The listener attribute message carries the port identifier of the listener device. The network device 01 stores a topology of the TSN. Therefore, the network device 01 may determine candidate transmission paths of the first data stream based on the port identifier of the talker device and the port identifier of the listener device. For example, the candidate transmission paths of the first data streams include a candidate transmission path 1 and a candidate transmission path 2. The candidate transmission path 1 is a path from the talker device to the listener device through the network device 03, the network device 04, and the network device 05. The candidate transmission path 2 is a path from the talker device to the listener device through the network device 01, the network device 02, and the network device 05. The network device 01 determines the first traffic scheduling information based on the first talker attribute message and the candidate transmission paths of the first data stream. In a possible implementation, the network device 01 determines that the traffic scheduling information delivered to a network device on the candidate transmission path 1 may meet a requirement indicated by the first talker attribute message. The network device 01 determines that the traffic scheduling information delivered to a network device on the candidate transmission path 2 may also meet the requirement indicated in the first talker attribute message. The candidate transmission path 1 is a shortest path in the candidate transmission paths of the first data stream. In this way, the network device 01 determines the candidate transmission path 1 as the transmission path of the first data stream. In another possible implementation, the network device 01 determines that the traffic scheduling information delivered to a network device on the candidate transmission path 1 may meet a requirement indicated by the first talker attribute message. The network device 01 determines that the traffic scheduling information delivered to a network device on the candidate transmission path 2 cannot meet the requirement indicated in the first talker attribute message. In this way, the network device 01 determines the candidate transmission path 1 as the transmission path of the first data stream. In still another possible implementation, the network device 01 determines both the candidate transmission path 1 and the candidate transmission path 2 as the transmission paths of the first data stream. The network device 01 delivers the traffic scheduling information to both the network device on the candidate transmission path 1 and the network device on the candidate transmission path 2.

S104. The first network device sends a first traffic scheduling message to a network device on the transmission path, where the first traffic scheduling message includes the first traffic scheduling information, the first traffic scheduling information indicates the network device on the transmission path to generate a gate control list, and the gate control list indicates the network device on the transmission path to control, based on the gate control list, a state of a port used to transmit the first data stream.

For example, after generating the first traffic scheduling information, the network device 01 encapsulates the first traffic scheduling information into a first traffic scheduling message. The network device 01 sends the first traffic scheduling message to the network device on the transmission path of the first data stream. The first traffic scheduling information indicates the network device on the transmission path to generate a gate control list. The gate control list indicates the network device on the transmission path to control, based on the gate control list, a state of a port used to transmit the first data stream. For an implementation of the gate control list, refer to descriptions in section 8.6.8.4 in IEEE P802.1Qbv/D3.1. The first traffic scheduling message may be an SRP message, and may be specifically an MSRP message. The MSRP message may be transmitted in compliance with a MRP or a LRP. Therefore, the first traffic scheduling message may be referred to as an MRP message or an LRP message.

Optionally, the first traffic scheduling information includes a first MAC address and a first port identifier. The first MAC address is used to indicate a MAC address of the network device on the transmission path. The first port identifier is used to indicate a port through which the network device on the transmission path receives the first traffic scheduling message.

For example, FIG. 5 shows an implementation of the first traffic scheduling information. Specifically, the first traffic scheduling information may be implemented based on a TLV encapsulation format. For example, a value of a type field is set to 23. A value of a length field is set to a variable-length byte. As shown in FIG. 5, a value of a MAC address field is the first MAC address. A value of a port field is a first port identifier. Because times at which the first data stream arrives at network devices on the transmission path are different, first traffic scheduling messages delivered by the network device 01 to different network devices on the transmission path of the first data stream are different. For example, for the first data stream, a first traffic scheduling message delivered by the network device 01 to the network device 03 is different from a first traffic scheduling message delivered to the network device 04. Therefore, the network device on the transmission path of the first data stream may forward a stream queue of the first data stream based on an accurate time.

Optionally, the first traffic scheduling information further includes a start time of a period of the gate control list and a gate state of the gate control list. The first traffic scheduling information further includes at least two pieces of the following information a quantity of timeslots in each period of the gate control list, a length of the period of the gate control list, and a length of a timeslot of the gate control list.

As shown in FIG. 5, the length of the period of the gate control list is used to indicate duration of a period of the gate control list. The quantity of timeslots in each period of the gate control list is used to indicate a quantity of timeslots in one period of the gate control list. The length of the timeslot of the gate control list is used to indicate duration of each timeslot. A conversion relationship exists between the quantity of timeslots in each period of the gate control list, the length of the period of the gate control list, and the length of the timeslot of the gate control list. In other words, any two pieces of information can be used to obtain another piece of information. The start time of the period of the gate control list is used to indicate a start time of a first period of the gate control list. The start time of the period of the gate control list may include two fields. For example, a unit of a field 1 is second, and a unit of a field 2 is microsecond. The gate state of the gate control list is used to indicate an open state and a closed state of a gate. When the gate is in the open state, the network device is allowed to send the stream queue of the first data stream through the port used to transmit the first data stream. When the gate is in the closed state, the network device is not allowed to send the stream queue of the first data stream through the port used to transmit the first data stream.

Optionally, the first traffic scheduling information further includes time extension information. The time extension information is used to indicate an extension time of currently effective traffic scheduling information before the first traffic scheduling information takes effect.

For example, a requirement for transmitting the first data stream may change. In this case, the talker device sends a new first talker attribute message. Correspondingly, the network device 01 updates the first traffic scheduling information, and delivers a new first traffic scheduling message. To avoid a packet loss or disorder, the new first traffic scheduling message may include the time extension information. Therefore, when the extension time expires, the new first traffic scheduling message replaces the original first traffic scheduling message and takes effect.

Optionally, the first traffic scheduling information further includes a traffic scheduling enabling field. The traffic scheduling enabling field is used to indicate whether a port through which the network device on the transmission path receives the first traffic scheduling message enables the traffic scheduling function.

For example, the network device 01 may determine, based on the traffic scheduling enabling field, whether to allow the port through which the network device on the transmission path receives the first traffic scheduling message enables the traffic scheduling function. For example, the network device 04 is responsible for transmitting a data stream 01, a data stream 02, and a data stream 03. In addition, for the data stream 01 and the data stream 02, the network device 01 has delivered traffic scheduling messages to the network device 04. The network device 01 determines, based on historical delivered information, that the network device 04 has no redundant resource used to forward the data stream 03. Therefore, for the data stream 03, the network device 01 sets a value of a traffic scheduling enabling field included in the traffic scheduling information sent to the network device 04 to 1, so that the network device 04 is not allowed to enable the traffic scheduling function.

The first traffic scheduling information shown in FIG. 5 is determined by the network device 01 based on an algorithm. The first traffic scheduling information determined by the network device 01 meets a requirement of the first talker attribute message sent by the talker device. For example, the first traffic scheduling information determined by the network device 01 meets a requirement of a traffic specification field in the first talker attribute message. The first traffic scheduling information determined by the network device 01 meets requirements of a traffic specification field and a traffic specification time description field in the first talker attribute message. Alternatively, the first traffic scheduling information determined by the network device 01 meets requirements of a traffic specification field, a traffic specification time description field, and a field of a user to network requirements, in the first talker attribute message.

S105. A second network device receives the first traffic scheduling message sent by the first network device.

With reference to the foregoing implementation, as shown in FIG. 2, the second network device may be the network device 03, the network device 04, the network device 05, or the talker device. For example, the second network device is the network device 03. The network device 03 receives the first traffic scheduling message sent by the network device 01, and then the network device 03 obtains the first traffic scheduling information in the first traffic scheduling message.

S106. The second network device generates a gate control list based on the first traffic scheduling information.

S107. The second network device controls, based on the gate control list, a state of a port used to transmit the first data stream.

For example, after receiving the first traffic scheduling message sent by the network device 01, the network device 03 generates a gate control list based on the first traffic scheduling information in the first traffic scheduling message. The network device 03 controls, based on the gate control list, a state of the port used to transmit the first data stream. The network device 03 controls, based on a traffic class of the stream queue of the first data stream, included in the gate control list and a timeslot included in the gate control list, the state of the port used to transmit the first data stream. The state of the port used to transmit the first data stream includes an open state and a closed state. The open state is used to indicate that a queue frame in the stream queue can be transmitted through the port. The closed state is used to indicate that a queue frame in the stream queue is not transmitted through the port.

According to the traffic scheduling method provided in this embodiment, the first network device configured to transmit the data stream in the TSN of the fully distributed model receives the first talker attribute message from the talker device and the listener attribute message from the listener device, and determines the first traffic scheduling information and the transmission path of the first data stream. The first network device sends the first traffic scheduling message including the first traffic scheduling information to the network device on the transmission path. After receiving the first traffic scheduling message, the network device on the transmission path generates the gate control list based on the first traffic scheduling information, and controls, based on the gate control list, the state of the port used to transmit the first data stream. According to the method in this embodiment, enhanced scheduled traffic is transmitted between the talker device and the listener device. This helps reduce a latency from the talker device to the listener device and improve latency stability.

In the foregoing implementation, the network device 01 is used as an example to describe an implementation of the first network device. In an actual scenario, the first network device may be a talker device. When the talker device is used as the first network device, after generating the first talker attribute described in the foregoing implementation, the talker device does not need to encapsulate the first talker attribute into a first talker attribute message, and the talker device also does not need to send the first talker attribute to the outside. The talker device sends the second talker attribute message described in the foregoing implementation, and the talker device receives the listener attribute message described in the foregoing implementation. Then, the talker device determines the first traffic scheduling information and the transmission path of the first data stream based on the first talker attribute and the listener attribute message from the listener device. The talker device sends the first traffic scheduling message including the first traffic scheduling information to the network device on the transmission path. After receiving the first traffic scheduling message, the network device on the transmission path generates the gate control list based on the first traffic scheduling information, and controls, based on the gate control list, the state of the port used to transmit the first data stream.

Optionally, before the step S101, the traffic scheduling method further includes steps S1001 and S1002.

S1001. The first network device receives a MAC address request message sent by a neighboring network device of the first network device, where the MAC address request message is used to obtain the MAC address of the first network device.

S1002. The first network device sends a MAC address reply message to the neighboring network device of the first network device based on the MAC address request message, where the MAC address reply message carries the MAC address of the first network device.

FIG. 6 is a diagram of an encapsulation format of MAC address information of a first network device according to an embodiment of this application. The MAC address information of the first network device may be implemented based on a TLV format. For example, a value of a type field is set to 24. A value of a length field is set to 8 bytes. A length of a scheduling configuration device flag field is 1 byte. A length of a MAC address field is 6 bytes. A length of a reserved field is 1 byte. The scheduling configuration device flag field is used to indicate whether a network device sending the MAC address information of the first network device stores the MAC address of the first network device. For example, if the value of the scheduling configuration device flag field is 0, it indicates that the network device sending the MAC address information of the first network device does not store the MAC address of the first network device. If the value of the scheduling configuration device flag field is 1, it indicates that the network device sending the MAC address information of the first network device stores the MAC address of the first network device. If the value of the scheduling configuration device flag field is 2, it indicates that the network device sending the MAC address information of the first network device is the first network device.

For example, assuming that the talker device does not know a MAC address of the network device 01, the talker device needs to obtain the MAC address of the network device 01 before sending the first talker attribute message. The talker device sends a MAC address request message to a neighboring network device of the talker device. The neighboring network device of the talker device is a network device directly connected to the talker device. For example, the neighboring network device is the network device 03 in FIG. 2. The MAC address request message includes the TLV shown in FIG. 6. In the TLV, the value of the scheduling configuration device flag field is 0, to indicate that the talker device does not store the MAC address of the network device 01. The value of the MAC address field is null. After receiving the MAC address request message, the network device 03 determines whether the network device 03 stores the MAC address of the network device 01. If the network device 03 stores the MAC address of the network device 01, the network device 03 generates a first MAC address reply message. A value of a scheduling configuration device flag field in the first MAC address reply message is 1, and a value of a MAC address field in the first MAC address reply message is the MAC address of the network device 01. The network device 03 sends the first MAC address reply message to a neighboring network device of the network device 03. In this way, the talker device may obtain the MAC address of the network device 01. If the network device 03 does not store the MAC address of the network device 01, the network device 03 forwards the MAC address request message to a neighboring network device of the network device 03. As shown in FIG. 2, the network device 01 receives the MAC address request message forwarded by the network device 03. The network device 01 generates a second MAC address reply message. A value of a scheduling configuration device flag field in the second MAC address reply message is 2, and a value of a MAC address field in the second MAC address reply message is the MAC address of the network device 01. Then, the network device 01 sends the second MAC address reply message to a neighboring network device of the network device 01. As shown in FIG. 2, the network device 03 receives the second MAC address reply message. The network device 03 may generate the first MAC address reply message based on the second MAC address reply message. The network device 03 sends the first MAC address reply message to the neighboring network device of the network device 03. In this way, the talker device may obtain the MAC address of the network device 01. In this way, by using TSN convergence feature, in a manner of sending a MAC address request message and a MAC address reply message to a neighboring network device, a network device in TSN of fully distributed model can quickly obtain a MAC address of a network device implementing traffic scheduling configuration. In addition, the MAC address request message may be an SRP message, and may be specifically an MSRP message. The MAC address reply message may be an SRP message, and may be specifically an MSRP message.

Optionally, before the step S102, the traffic scheduling method further includes steps S1011, S1012, and S1013.

S1011. The first network device receives a second talker attribute message sent by the talker device, where the second talker attribute message indicates to request the listener device to receive the first data stream, the second talker attribute message includes the traffic scheduling enabling information and a second destination MAC address, and the second destination MAC address is a MAC address of the listener device.

S1012. The first network device skips reserving, based on the traffic scheduling enabling information included in the second talker attribute message, a resource for transmitting the first data stream.

S1013. The first network device forwards the second talker attribute message to the listener device.

In the foregoing implementation, the network device 01 is used as an example to describe the first network device implementing the traffic scheduling configuration function. In an actual scenario, the first network device completes a traffic scheduling configuration process of the first data stream. The first network device may further be the network device on the transmission path of the first data stream. For example, the network device is the network device 04. It is assumed that the network device 04 is the first network device. For that the network device 04 implements the traffic scheduling configuration function, refer to the description of the network device 01 in the foregoing implementation. Details are not described herein again. In addition, after receiving the second talker attribute message, the network device 04 may further determine a specific operation based on the traffic scheduling enabling information included in the second talker attribute message. Specifically, if a value of an enabling flag field carried in the traffic scheduling enabling information in the second talker attribute message is 1, it indicates that the traffic scheduling function is enabled. The network device 04 does not perform an operation of reserving the resource for transmitting the first data stream, but directly forwards the second talker attribute message to the listener device. If a value of an enabling flag field carried in the traffic scheduling enabling information in the second talker attribute message is 0, it indicates that the traffic scheduling function is not enabled. The network device 04 performs an operation of reserving the resource for transmitting the first data stream, to request to reserve the resource based on the implementation shown in FIG. 1.

Optionally, the second network device generates the first talker attribute message based on the second talker attribute message. A payload of the second talker attribute message is the same as a payload of the first talker attribute message. The second network device sends the first talker attribute message to the first network device.

According to the foregoing implementation, the talker device generates the first talker attribute message and the second talker attribute message, and sends the first talker attribute message and the second talker attribute message to the outside. In an actual scenario, the talker device may generate only the second talker attribute message, and then the talker device sends the second talker attribute message to a neighboring network device of the talker device. For example, the neighboring network device is the network device 03 in FIG. 2. The network device 03 copies the second talker attribute message and modifies the destination MAC address in the copied talker attribute message to obtain the first talker attribute message. In this way, the talker device does not need to know the MAC address of the network device 01.

Optionally, the second network device receives the listener attribute message sent by the listener device. The second network device forwards the listener attribute message to the talker device.

According to the foregoing implementation, the listener device may send the listener attribute message in a unicast or broadcast manner. The second network device may receive the listener attribute message, and forward the listener attribute message to the talker device.

Figure 7:
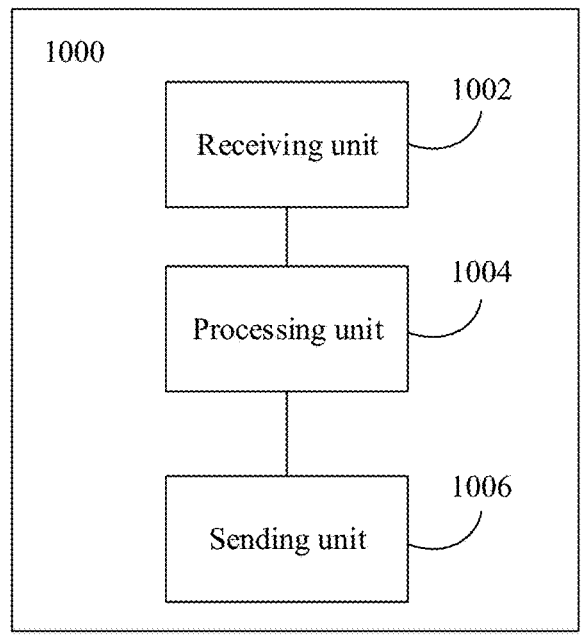
FIG. 7 is a schematic diagram of a structure of a first network device according to an embodiment of this application.

FIG. 7 is a schematic diagram of a structure of a first network device 1000 according to an embodiment of this application. The first network device 1000 shown in FIG. 7 may perform corresponding steps performed by the first network device in the method in the foregoing embodiment. The first network device is deployed in TSN using a fully distributed model. The TSN further includes a talker device and a listener device. The first network device, the talker device, and the listener device are configured to transmit a data stream. As shown in FIG. 7, the first network device 1000 includes a receiving unit 1002, a processing unit 1004, and a sending unit 1006.

The receiving unit 1002 is configured to receive a first talker attribute message sent by the talker device. The first talker attribute message includes a port identifier of the talker device and traffic scheduling enabling information. The traffic scheduling enabling information indicates to request the first network device to allocate first traffic scheduling information of a first data stream. The port identifier of the talker device is used to indicate an egress port of the first data stream. A first destination MAC address included in the first talker attribute message is a MAC address of the first network device.

The receiving unit 1002 is further configured to receive a listener attribute message sent by the listener device. The listener attribute message is used to indicate that the listener device is a receiving end of the first data stream. The listener attribute message includes a port identifier of the listener device. The port identifier of the listener device is used to indicate an ingress port of the first data stream.

The processing unit 1004 is configured to determine the first traffic scheduling information and a transmission path of the first data stream based on the first talker attribute message and the listener attribute message.

The sending unit 1006 is configured to send a first traffic scheduling message to a network device on the transmission path. The first traffic scheduling message includes the first traffic scheduling information. The first traffic scheduling information indicates the network device on the transmission path to generate a gate control list. The gate control list indicates the network device on the transmission path to control, based on the gate control list, a state of a port used to transmit the first data stream.

Optionally, the first traffic scheduling information includes a first MAC address and a first port identifier. The first MAC address is used to indicate a MAC address of the network device on the transmission path. The first port identifier is used to indicate a port through which the network device on the transmission path receives the first traffic scheduling message.

Optionally, the first traffic scheduling information further includes a start time of a period of the gate control list and a gate state of the gate control list. The first traffic scheduling information further includes at least two pieces of the following information a quantity of timeslots in each period of the gate control list, a length of the period of the gate control list, and a length of a timeslot of the gate control list.

Optionally, the first traffic scheduling information further includes time extension information. The time extension information is used to indicate an extension time of currently effective traffic scheduling information before the first traffic scheduling information takes effect.

Optionally, before the receiving unit 1002 receives the first talker attribute message sent by the talker device, the receiving unit 1002 is further configured to receive a MAC address request message sent by a neighboring network device of the first network device. The MAC address request message is used to obtain the MAC address of the first network device. The processing unit 1004 is further configured to control, based on the MAC address request message, the sending unit 1006 to send a MAC address reply message to the neighboring network device of the first network device. The MAC address reply message carries the MAC address of the first network device.

Optionally, the processing unit 1004 is further configured to determine, based on the listener attribute message, that the listener device is capable of receiving the first data stream. The processing unit 1004 is further configured to determine, based on the traffic scheduling enabling information and the first destination MAC address that are included in the first talker attribute message, that the first talker attribute message is used to request the first network device to allocate the first traffic scheduling information of the first data stream. The processing unit 1004 is further configured to determine the first traffic scheduling information and the transmission path based on the first talker attribute message and the port identifier of the listener device.

Optionally, the sending unit 1006 is further configured to forward the listener attribute message to the talker device.

Optionally, before the receiving unit 1002 receives the listener attribute message sent by the listener device, the receiving unit 1002 is further configured to receive a second talker attribute message sent by the talker device. The second talker attribute message indicates to request the listener device to receive the first data stream. The second talker attribute message includes the traffic scheduling enabling information and a second destination MAC address. The second destination MAC address is a MAC address of the listener device. The processing unit 1004 is further configured to skip reserving, based on the traffic scheduling enabling information included in the second talker attribute message, a resource for transmitting the first data stream. The sending unit 1006 is further configured to forward the second talker attribute message to the listener device.

Optionally, the first traffic scheduling message is an MRP message or an LRP message.

The first network device shown in FIG. 7 may perform the corresponding steps performed by the first network device in the method in the foregoing embodiment. In the TSN of the fully distributed model, the first network device configured to transmit the data stream determines the first traffic scheduling information and the transmission path of the first data stream based on the first talker attribute message received from the talker device and the listener attribute message received from the listener device. The first network device sends the first traffic scheduling message including the first traffic scheduling information to the network device on the transmission path. After receiving the first traffic scheduling message, the network device on the transmission path generates a gate control list based on the first traffic scheduling information, and controls, based on the gate control list, a state of a port used to transmit the first data stream. According to the method provided in the embodiments, enhanced scheduled traffic is transmitted between the talker device and the listener device. This helps reduce a latency from the talker device to the listener device and improve latency stability.

Figure 8:
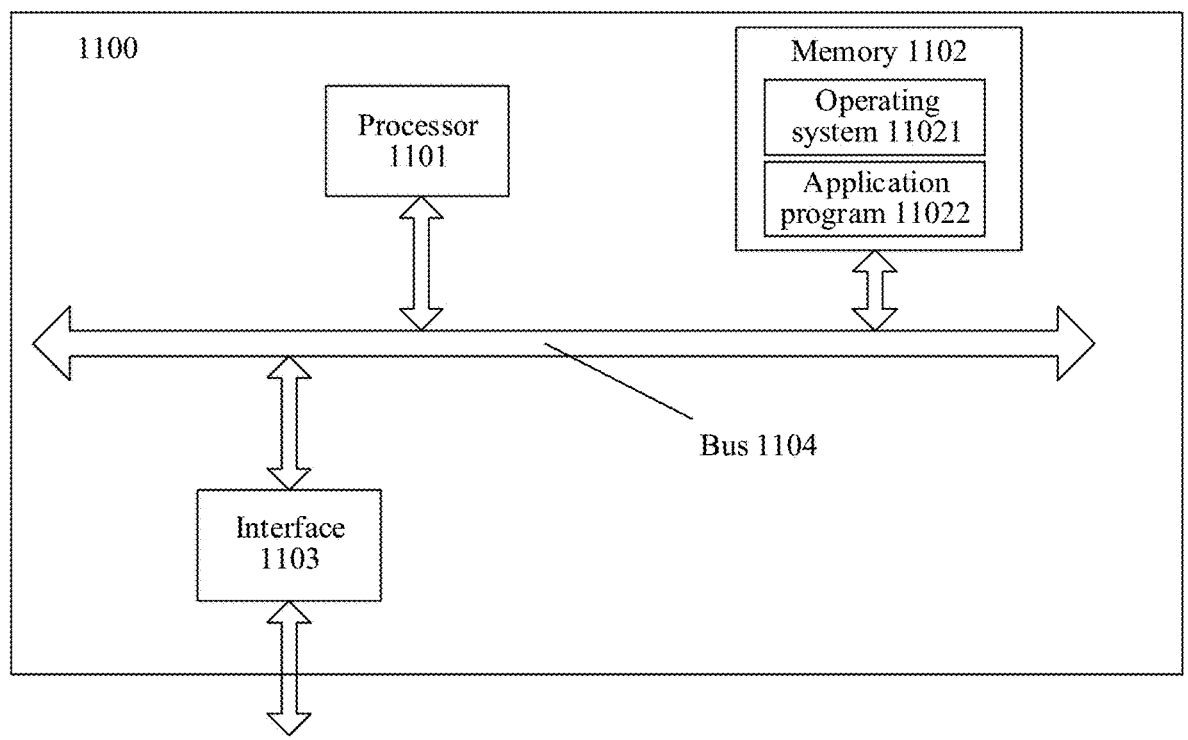
FIG. 8 is a schematic diagram of a hardware structure of a first network device according to an embodiment of this application.

FIG. 8 is a schematic diagram of a hardware structure of a first network device 1100 according to an embodiment of this application. The first network device 1100 shown in FIG. 8 may perform corresponding steps performed by the first network device in the method in the foregoing embodiment.

As shown in FIG. 8, the first network device 1100 includes a processor 1101, a memory 1102, an interface 1103, and a bus 1104. The interface 1103 may be implemented in a wireless or wired manner, and may be specifically a network adapter. The processor 1101, the memory 1102, and the interface 1103 are connected through the bus 1104.

The interface 1103 may specifically include a transmitter and a receiver, and is configured to receive and send information between the first network device and the talker device, the listener device, and the network device on the transmission path in the foregoing embodiment. For example, the interface 1103 is configured to support receiving the first talker attribute message sent by the talker device. For another example, the interface 1103 is configured to support receiving the listener attribute message sent by the listener device. For still another example, the interface 1103 is configured to support sending the first traffic scheduling message to the network device on the transmission path. For example, the interface 1103 is configured to support the processes S101, S102, and S104 in FIG. 3. The processor 1101 is configured to perform processing performed by the first network device in the foregoing embodiment. For example, the processor 1101 is configured to determine the first traffic scheduling information and the transmission path of the first data stream, and/or perform another process used for the technology described in this specification. For example, the processor 1101 is configured to support the process S103 in FIG. 3. The memory 1102 includes an operating system 11021 and an application program 11022, and is configured to store a program, code, or an instruction. When executing the program, the code, or the instruction, a processor or a hardware device may complete a processing process of the first network device in the foregoing method embodiment. Optionally, the memory 1102 may include a ROM and a RAM. The ROM includes a BIOS or an embedded system. The RAM includes an application program and an operating system. When the first network device 1100 needs to run, a bootloader in the BIOS or the embedded system that is built into the ROM is used to boot a system to start, and boot the first network device 1100 to enter a normal running state. After entering the normal running state, the first network device 1100 runs the application program and the operating system in the RAM, to complete the processing processes of the first network device in the method embodiment.

It may be understood that FIG. 8 shows only a simplified design of the first network device 1100. In actual application, the first network device may include any quantity of interfaces, processors, or memories.

Figure 9:
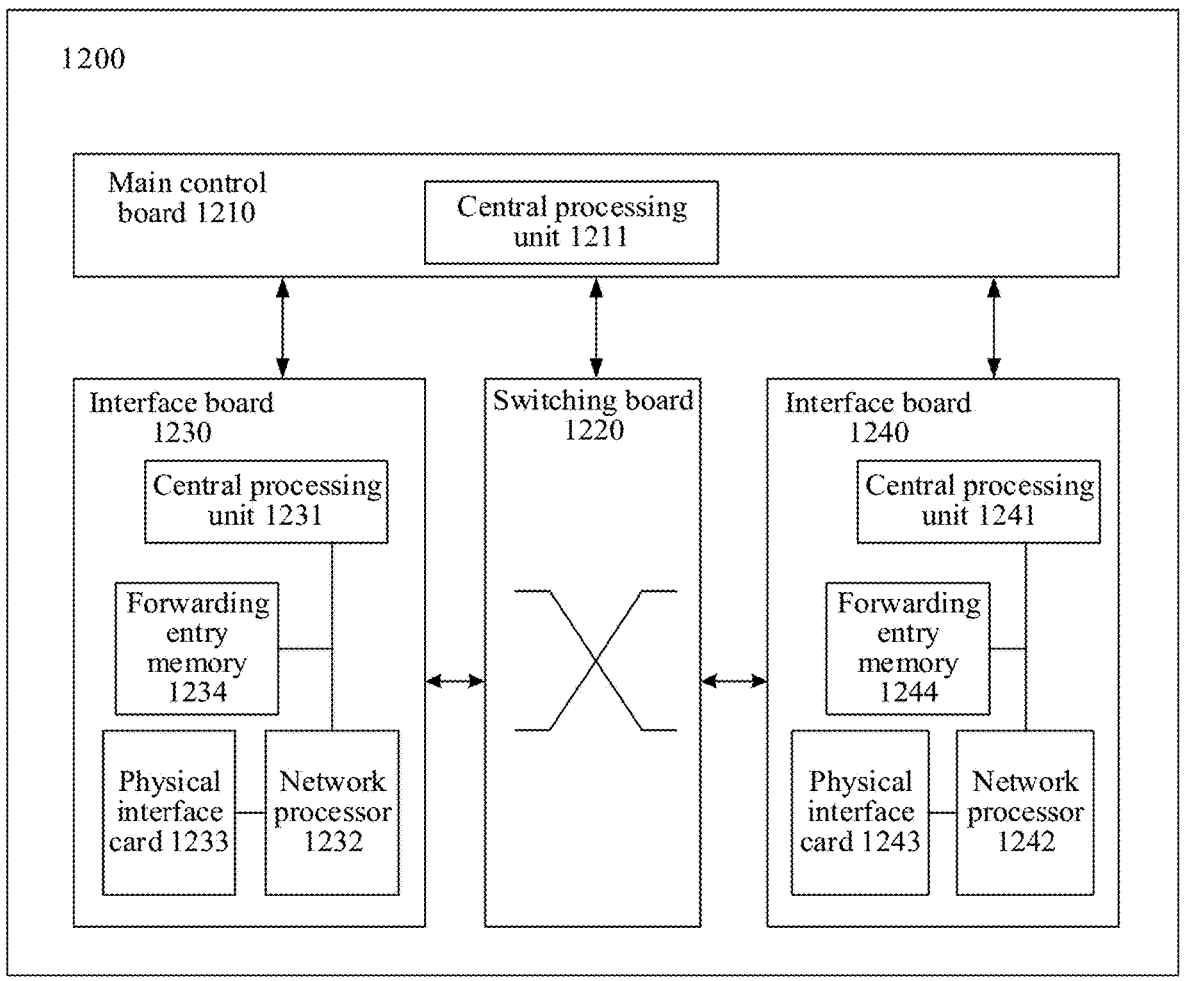
FIG. 9 is a schematic diagram of a hardware structure of another first network device according to an embodiment of this application.

FIG. 9 is a schematic diagram of a hardware structure of another first network device 1200 according to an embodiment of this application. The first network device 1200 shown in FIG. 9 may perform corresponding steps performed by the first network device in the method in the foregoing embodiment.

As shown in FIG. 9, the first network device 1200 includes a main control board 1210, an interface board 1230, a switching board 1220, and an interface board 1240. The main control board 1210, the interface boards 1230 and 1240, and the switching board 1220 are connected to a system backboard through a system bus for communication. The main control board 1210 is configured to complete functions such as system management, device maintenance, and protocol processing. The switching board 1220 is configured to exchange data between interface boards (the interface board is also referred to as a line card or a service board). The interface boards 1230 and 1240 are configured to provide various service interfaces (for example, a packet-over-synchronous optical networking (POS) interface, a gigabit Ethernet (GE) interface, and an asynchronous transfer mode (ATM) interface), and forward a data packet.

The interface board 1230 may include a central processing unit 1231, a forwarding entry memory 1234, a physical interface card 1233, and a network processor 1232. The central processing unit 1231 is configured to control and manage the interface board, and communicate with a central processing unit on the main control board. The forwarding entry memory 1234 is configured to store a forwarding entry. The physical interface card 1233 is configured to receive and send traffic. The network processor 1232 is configured to control, based on the forwarding entry, the physical interface card 1233 to receive and send the traffic.

Specifically, the physical interface card 1233 is configured to receive the first talker attribute message sent by the talker device and receive the listener attribute message sent by the listener device.

After receiving the first talker attribute message and the listener attribute message, the physical interface card 1233 sends the first talker attribute message and the listener attribute message to the central processing unit 1211 by using the central processing unit 1231. The central processing unit 1211 processes the first talker attribute message and the listener attribute message.

The central processing unit 1211 is further configured to determine the first traffic scheduling information and a transmission path of the first data stream.

The central processing unit 1231 is further configured to control the network processor 1232 to obtain the forwarding entry in the forwarding entry memory 1234. The central processing unit 1231 is further configured to control the network processor 1232 to send, through the physical interface card 1233, a first traffic scheduling message to a network device on the transmission path.

It should be understood that operations on the interface board 1240 are the same as the operations on the interface board 1230 in this embodiment of the present application. For brevity, details are not described. It should be understood that the first network device 1200 in this embodiment may correspond to the functions and/or the various implemented steps in the foregoing method embodiment. Details are not described herein.

In addition, it should be noted that there may be one or more main control boards. When there are a plurality of main control boards, a primary main control board and a secondary main control board may be included. There may be one or more interface boards. The first network device having a stronger data processing capability provides more interface boards. There may also be one or more physical interface cards on the interface board. There may be no switching board or there may be one or more switching boards. When there are a plurality of switching boards, load sharing and redundancy backup may be implemented together. In a centralized forwarding architecture, the first network device may need no switching board. The interface board provides a function of processing service data of an entire system. In a distributed forwarding architecture, the first network device may have at least one switching board. Data between a plurality of interface boards is exchanged through the switching board, to provide a large-capacity data exchange and processing capability. Therefore, a data access and processing capability of the first network device in the distributed architecture is better than that of the device in the centralized architecture. Which architecture is specifically used depends on a specific networking deployment scenario. This is not limited herein.

In addition, an embodiment of this application provides a computer storage medium configured to store a computer software instruction used by the foregoing first network device. The computer software instruction includes a program designed for performing the foregoing method embodiment.

Figure 10:
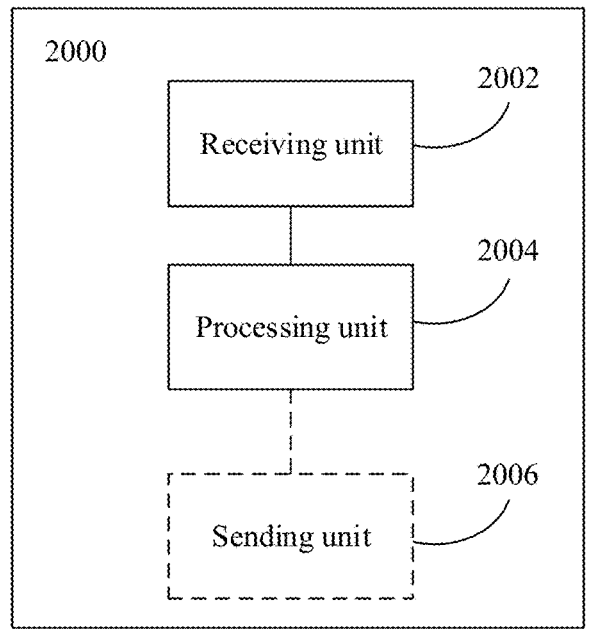
FIG. 10 is a schematic diagram of a structure of a second network device according to an embodiment of this application.

FIG. 10 is a schematic diagram of a structure of a second network device 2000 according to an embodiment of this application. The second network device 2000 shown in FIG. 10 may perform corresponding steps performed by the second network device in the method in the foregoing embodiment. The second network device is deployed in TSN using a fully distributed model. The TSN further includes a first network device and a listener device. The first network device, the second network device, and the listener device are configured to transmit a data stream. As shown in FIG. 10, the second network device 2000 includes a receiving unit 2002 and a processing unit 2004.

The receiving unit 2002 is configured to receive a first traffic scheduling message sent by the first network device. The first traffic scheduling message includes first traffic scheduling information. The first traffic scheduling information is traffic scheduling information determined by the first network device based on a first talker attribute message and a listener attribute message. The first talker attribute message includes a port identifier of a talker device and traffic scheduling enabling information. The traffic scheduling enabling information indicates to request the first network device to allocate first traffic scheduling information of a first data stream. The port identifier of the talker device is used to indicate an egress port of the first data stream. A first destination MAC address included in the first talker attribute message is a MAC address of the first network device. The listener attribute message is used to indicate that the listener device is a receiving end of the first data stream. The listener attribute message includes a port identifier of the listener device. The port identifier of the listener device is used to indicate an ingress port of the first data stream.

The processing unit 2004 is configured to generate a gate control list based on the first traffic scheduling information.

The processing unit 2004 is further configured to control, based on the gate control list, a state of a port used to transmit the first data stream.

Optionally, the second network device further includes a sending unit 2006. Before the receiving unit 2002 receives the first traffic scheduling message sent by the first network device, the receiving unit 2002 is further configured to receive a second talker attribute message sent by the talker device. The second talker attribute message indicates to request the listener device to receive the first data stream. The second talker attribute message includes the traffic scheduling enabling information and a second destination MAC address. The second destination MAC address is a MAC address of the listener device. The processing unit 2004 is further configured to skip reserving, based on the traffic scheduling enabling information included in the second talker attribute message, a resource for transmitting the first data stream. The sending unit 2006 is configured to forward the second talker attribute message to the listener device.

Optionally, the processing unit 2004 is further configured to generate the first talker attribute message based on the second talker attribute message. A payload of the second talker attribute message is the same as a payload of the first talker attribute message. The sending unit 2006 is further configured to send the first talker attribute message to the first network device.

Optionally, the second network device is the talker device. Before the receiving unit 2002 receives the first traffic scheduling message sent by the first network device, the sending unit 2006 is configured to send the first talker attribute message to the first network device. The sending unit 2006 is further configured to send a second talker attribute message to the listener device. The second talker attribute message indicates to request the listener device to receive the first data stream. The second talker attribute message includes the traffic scheduling enabling information and a second destination MAC address. The second destination MAC address is a MAC address of the listener device. The receiving unit 2002 is further configured to receive the listener attribute message that is sent by the listener device and forwarded by the first network device.

Optionally, before the sending unit 2006 sends the first talker attribute message to the first network device, the sending unit 2006 is further configured to send a MAC address request message to a neighboring network device of the second network device. The MAC address request message is used to obtain the MAC address of the first network device.

The receiving unit 2002 is further configured to receive a MAC address reply message sent by the neighboring network device of the second network device. The MAC address reply message carries the MAC address of the first network device.

Optionally, the first traffic scheduling information further includes a start time of a period of the gate control list and a gate state of the gate control list. The first traffic scheduling information further includes at least two pieces of the following information a quantity of timeslots in each period of the gate control list, a length of the period of the gate control list, and a length of a timeslot of the gate control list.

Optionally, the first traffic scheduling information further includes time extension information. The time extension information is used to indicate an extension time of currently effective traffic scheduling information before the first traffic scheduling information takes effect.

Optionally, the first traffic scheduling message is an MRP message or an LRP message.

The second network device shown in FIG. 10 may perform the corresponding steps performed by the second network device in the method of the foregoing embodiment. In the TSN of the fully distributed model, after receiving the first traffic scheduling message, the second network device on the transmission path generates the gate control list based on the first traffic scheduling information, and controls, based on the gate control list, the state of the port used to transmit the first data stream. According to the method provided in the embodiments, enhanced scheduled traffic is transmitted between the talker device and the listener device. This helps reduce a latency from the talker device to the listener device and improve latency stability.

Figure 11:
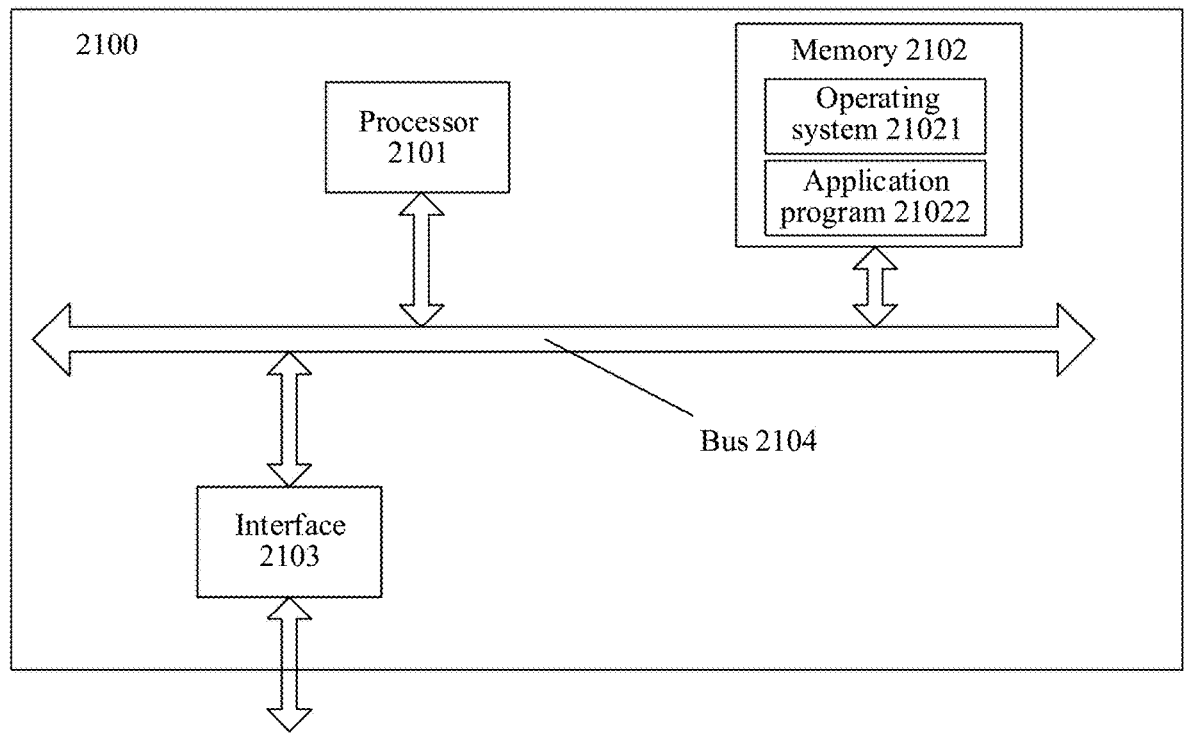
FIG. 11 is a schematic diagram of a hardware structure of a second network device according to an embodiment of this application.

FIG. 11 is a schematic diagram of a hardware structure of a second network device 2100 according to an embodiment of this application. The second network device 2100 shown in FIG. 11 may perform corresponding steps performed by the second network device in the method in the foregoing embodiment.

As shown in FIG. 11, the second network device 2100 includes a processor 2101, a memory 2102, an interface 2103, and a bus 2104. The interface 2103 may be implemented in a wireless or wired manner, and may be specifically a network adapter. The processor 2101, the memory 2102, and the interface 2103 are connected through the bus 2104.

The interface 2103 may specifically include a transmitter and a receiver, and is configured to receive and send information between the second network device and the first network device in the foregoing embodiment. For example, the interface 2103 is configured to support receiving the first traffic scheduling message sent by the first network device. For example, the interface 2103 is configured to support the process S105 in FIG. 3. The processor 2101 is configured to perform processing performed by the second network device in the foregoing embodiment. For example, the processor 2101 is configured to generate the gate control list, control based on the gating control list, the state of the port used to transmit the first data stream, and/or perform another process used for the technology described in this specification. For example, the processor 2101 is configured to support the processes S106 and S107 in FIG. 3. The memory 2102 includes an operating system 21021 and an application program 21022, and is configured to store a program, code, or an instruction. When executing the program, the code, or the instruction, the processor or a hardware device may complete a processing process of the second network device in the foregoing method embodiment. Optionally, the memory 2102 may include a ROM and a RAM. The ROM includes a BIOS or an embedded system. The RAM includes an application program and an operating system. When the second network device 2100 needs to run, a bootloader in the BIOS or the embedded system that is built into the ROM is used to boot a system to start, and boot the second network device 2100 to enter a normal running state. After entering the normal running state, the second network device 2100 runs the application program and the operating system in the RAM, to complete the processing process of the second network device in the method embodiment.

It may be understood that FIG. 11 shows only a simplified design of the second network device 2100. In actual application, the second network device may include any quantity of interfaces, processors, or memories.

Figure 12:
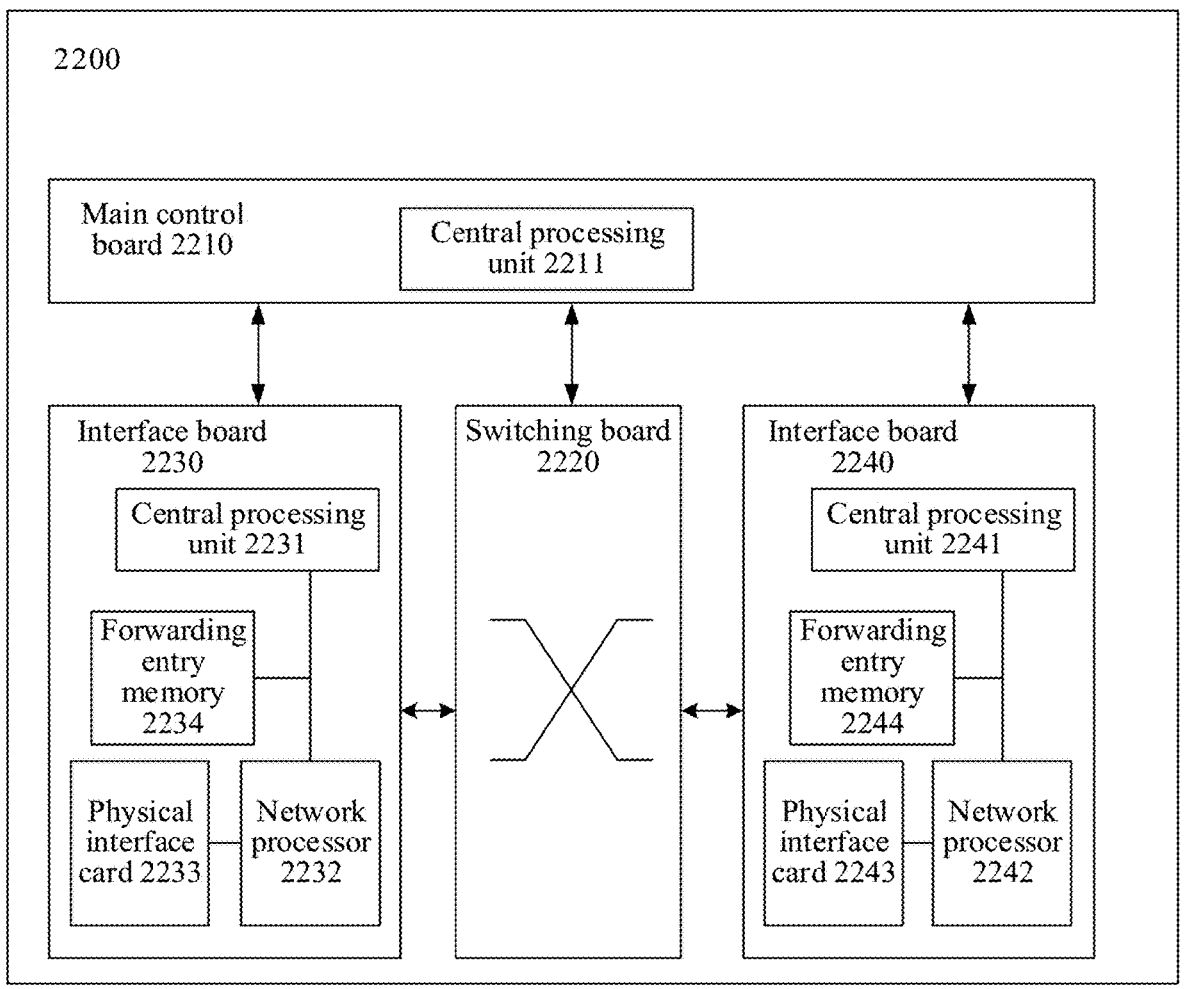
FIG. 12 is a schematic diagram of a hardware structure of another second network device according to an embodiment of this application.

FIG. 12 is a schematic diagram of a hardware structure of another second network device 2200 according to an embodiment of this application. The second network device 2200 shown in FIG. 12 may perform corresponding steps performed by the second network device in the method in the foregoing embodiment.

As shown in FIG. 12, the second network device 2200 includes a main control board 2210, an interface board 2230, a switching board 2220, and an interface board 2240. The main control board 2210, the interface boards 2230 and 2240, and the switching board 2220 are connected to a system backboard through a system bus for communication. The main control board 2210 is configured to complete functions such as system management, device maintenance, and protocol processing. The switching board 2220 is configured to exchange data between interface boards (the interface board is also referred to as a line card or a service board). The interface boards 2230 and 2240 are configured to provide various service interfaces (for example, a POS interface, a GE interface, and an ATM interface), and forward a data packet.

The interface board 2230 may include a central processing unit 2231, a forwarding entry memory 2234, a physical interface card 2233, and a network processor 2232. The central processing unit 2231 is configured to control and manage the interface board, and communicate with a central processing unit on the main control board. The forwarding entry memory 2234 is configured to store a forwarding entry. The physical interface card 2233 is configured to receive and send traffic. The network processer 2232 is configured to control, based on the forwarding entry, the physical interface card 2233 to receive and send the traffic.

Specifically, the physical interface card 2233 is configured to receive the first traffic scheduling message sent by the first network device.

After receiving the first traffic scheduling message, the physical interface card 2233 sends the first traffic scheduling message to the central processing unit 2211 by using the central processing unit 2231. The central processing unit 2211 processes the first traffic scheduling message.

The central processing unit 2211 is configured to generate the gate control list based on the first traffic scheduling information, and is configured to control, based on the gate control list, the state of the port used to transmit the first data stream.

The central processing unit 2231 is further configured to control the network processer 2232 to obtain the forwarding entry in the forwarding entry memory 2234, and the central processing unit 2231 is further configured to control the network processer 2232 to receive and send the traffic by using the physical interface card 2233.

It should be understood that operations on the interface board 2240 are the same as the operations on the interface board 2230 in this embodiment of the present application. For brevity, details are not described. It should be understood that the second network device 2200 in this embodiment may correspond to the functions and/or the various implemented steps in the foregoing method embodiment. Details are not described herein.

In addition, it should be noted that there may be one or more main control boards. When there are a plurality of main control boards, a primary main control board and a secondary main control board may be included. There may be one or more interface boards. A second network device having a stronger data processing capability provides more interface boards. There may also be one or more physical interface cards on the interface board. There may be no switching board or there may be one or more switching boards. When there are a plurality of switching boards, load sharing and redundancy backup may be implemented together. In a centralized forwarding architecture, the second network device may need no switching board, and the interface board provides a function of processing service data of an entire system. In a distributed forwarding architecture, the second network device may have at least one switching board. Data between a plurality of interface boards is exchanged through the switching board, to provide a large-capacity data exchange and processing capability. Therefore, a data access and processing capability of the second network device in the distributed architecture is better than that of the device in the centralized architecture. Which architecture is specifically used depends on a specific networking deployment scenario. This is not limited herein.

In addition, an embodiment of this application provides a computer storage medium configured to store a computer software instruction used by the foregoing second network device. The computer software instruction includes a program designed for performing the foregoing method embodiment.

An embodiment of this application further includes a network system. The network system includes a first network device and a second network device. The first network device is the first network device in FIG. 7, FIG. 8, or FIG. 9. The second network device is the second network device in FIG. 10, FIG. 11, or FIG. 12.

The method or algorithm steps described with reference to the content disclosed in this application may be implemented by hardware, or may be implemented by a processor by executing a software instruction. The software instruction may be formed by a corresponding software module. The software module may be located in a RAM memory, a flash memory, a ROM memory, an erasable programmable ROM (EPROM) memory, an electrically erasable programmable ROM (EEPROM) memory, a register, a hard disk, a removable hard disk, a compact disc-ROM (CD-ROM), or a storage medium of any other form known in the art. For example, a storage medium is coupled to a processor, so that the processor can read information from the storage medium or write information into the storage medium. Certainly, the storage medium may be a component of the processor. The processor and the storage medium may be located in an application-specific integrated circuit (ASIC). In addition, the ASIC may be located in user equipment. Certainly, the processor and the storage medium may exist in the user equipment as discrete components.

A person skilled in the art should be aware that in one or more of the foregoing examples, the functions described in this application may be implemented by hardware or a combination of hardware and software. When this application is implemented by a combination of hardware and software, the software may be stored in a computer-readable medium or transmitted as one or more instructions or one or more pieces of code in a computer-readable medium. The computer-readable medium includes a computer storage medium and a communications medium. The communications medium includes any medium that enables a computer program to be transmitted from one place to another. The storage medium may be any available medium accessible to a general-purpose or dedicated computer.

The objectives, technical solutions, and beneficial effects of this application are further described in detail in the foregoing specific implementations. It should be understood that the foregoing descriptions are merely specific implementations of this application.

What is claimed is:

1. A method implemented by a first network device in a fully distributed model using Time-Sensitive Networking (TSN), wherein the method comprises:

receiving, from a talker device of a TSN network, a first talker attribute message requesting the first network device to deliver traffic scheduling information of a data stream, wherein the talker device is a transmitting end of the data stream;

receiving, from a listener device of the TSN network, a listener attribute message indicating that the listener device is a receiving end of the data stream;

determining, based on the first talker attribute message and the listener attribute message, the traffic scheduling information and a transmission path of the data stream, wherein the traffic scheduling information instructs generation of a gate control list for controlling a state of a first port for transmitting the data stream, and wherein the traffic scheduling information comprises time extension information indicating an extension time of currently effective traffic scheduling information before the traffic scheduling information takes effect; and sending, to a second network device on the transmission path, a traffic scheduling message comprising the traffic scheduling information.

2. The method of claim 1, wherein the traffic scheduling information further comprises a medium access control (MAC) address of the second network device and a port identifier indicating a second port through which the second network device receives the traffic scheduling message.

3. The method of claim 1, wherein the traffic scheduling information further comprises a start time of a period of the gate control list, a gate state of the gate control list, and at least two of a quantity of timeslots in each period of the gate control list, a length of the period of the gate control list, or a length of a timeslot of the gate control list.

4. The method of claim 1, wherein before receiving the first talker attribute message, the method further comprises:
receiving, from a neighboring network device of the first network device, a medium access control (MAC) address request message to obtain a destination MAC address, wherein the first talker attribute message comprises the destination MAC address, and wherein the destination MAC address is of the first network device; and
sending, to the neighboring network device based on the MAC address request message, a MAC address reply message comprising the destination MAC address.

5. The method of claim 4, wherein the listener attribute message comprises a port identifier of the listener device, and wherein determining the traffic scheduling information comprises:
determining, based on the listener attribute message, that the listener device is capable of receiving the data stream;
determining, based on the destination MAC address, that the first talker attribute message requests the first network device to allocate the traffic scheduling information; and
determining, based on the first talker attribute message and the port identifier, the traffic scheduling information and the transmission path.

6. The method of claim 1, further comprising forwarding the listener attribute message to the talker device.

7. The method of claim 1, wherein before receiving the listener attribute message, the method further comprises:
receiving, from the talker device, a second talker attribute message requesting the listener device to receive the data stream, wherein the second talker attribute message comprises traffic scheduling enabling information and a destination medium access control (MAC) address of the listener device;
skipping reserving, based on the traffic scheduling enabling information, a resource for transmitting the data stream; and
forwarding the second talker attribute message to the listener device.

8. The method of claim 1, wherein the traffic scheduling message is a Multiple Registration Protocol (MRP) message or a Link-local Registration Protocol (LRP) message.

9. The method of claim 1, wherein the transmission path passes through the talker device, the first network device, and the listener device.

10. The method of claim 1, further comprising further receiving the first talker attribute message according to a Stream Reservation Protocol (SRP).

11. The method of claim 1, wherein the listener attribute message is a unicast message.

12. The method of claim 1, further comprising:
receiving listener ready information with the listener attribute message, wherein the listener ready information; and
determining, based on the listener ready information, that the listener device is capable of receiving the data stream.

13. A method implemented by a first network device in a fully distributed model using Time-Sensitive Networking (TSN), wherein the method comprises:
receiving, from a second network device of a TSN network, a traffic scheduling message comprising traffic scheduling information, wherein the traffic scheduling information comprises time extension information indicating an extension time of currently effective traffic scheduling information before the traffic scheduling information takes effect, wherein the traffic scheduling information is based on a first talker attribute message and a listener attribute message, wherein the first talker attribute message requests the second network device to deliver the traffic scheduling information of a data stream, wherein the first talker attribute message indicates that a talker device is a transmitting end of the data stream, and wherein the listener attribute message indicates that a listener device is a receiving end of the data stream;
generating a gate control list based on the traffic scheduling information; and
controlling, based on the gate control list, a state of a port for transmitting the data stream.

14. The method of claim 13, wherein before receiving the traffic scheduling message, the method further comprises:
receiving, from the talker device, a second talker attribute message requesting the listener device to receive the data stream, wherein the second talker attribute message comprises traffic scheduling enabling information and a destination medium access control (MAC) address of the listener device;
skipping reserving, based on the traffic scheduling enabling information, a resource for transmitting the data stream; and
forwarding the second talker attribute message to the listener device.

15. The method of claim 14, further comprising:
generating the first talker attribute message based on the second talker attribute message, wherein a second payload of the second talker attribute message is the same as a first payload of the first talker attribute message; and
sending the first talker attribute message to the second network device.

16. The method of claim 15, wherein before sending the first talker attribute message to the second network device, the method further comprises:
sending, to a neighboring network device of the first network device, a MAC address request message to obtain the destination MAC address; and receiving, from the neighboring network device, a MAC address reply message comprising the destination MAC address.

17. The method of claim 13, wherein the first network device is the talker device, and wherein before receiving the traffic scheduling message, the method further comprises:
   sending, to the second network device, the first talker attribute message;
   sending, to the listener device, a second talker attribute message requesting the listener device to receive the data stream, wherein the second talker attribute message comprises traffic scheduling enabling information and a destination medium access control (MAC) address of the listener device; and
   receiving the listener attribute message from the second network device.

18. The method of claim 13, wherein the traffic scheduling information further comprises a start time of a period of the gate control list, a gate state of the gate control list, and at least two of a quantity of timeslots in each period of the gate control list, a length of the period of the gate control list, or a length of a timeslot of the gate control list.

19. The method of claim 13, wherein the traffic scheduling message is a Multiple Registration Protocol (MRP) message or a Link-local Registration Protocol (LRP) message.

20. A first network device in a fully distributed model using Time-Sensitive Networking (TSN), wherein the first network device comprises:
   a receiver configured to:
      receive, from a talker device of a TSN network, a first talker attribute message requesting the first network device to deliver traffic scheduling information of a data stream, wherein the talker device is a transmitting end of the data stream; and
      receive, from a listener device of the TSN network, a listener attribute message indicating that the listener device is a receiving end of the data stream;
   a processor coupled to the receiver and configured to determine, based on the first talker attribute message and the listener attribute message, the traffic scheduling information and a transmission path of the data stream, wherein the traffic scheduling information instructs generation of a gate control list for controlling a state of a first port for transmitting the data stream, and wherein the traffic scheduling information comprises time extension information indicating an extension time of currently effective traffic scheduling information before the traffic scheduling information takes effect; and
   a transmitter coupled to the processor and configured to send, to a second network device on the transmission path, a traffic scheduling message comprising the traffic scheduling information.

21. The first network device of claim 20, wherein the traffic scheduling information further comprises a medium access control (MAC) address of the second network device and a port identifier indicating a second port through which the second network device receives the traffic scheduling message.

22. The first network device of claim 20, wherein the traffic scheduling information further comprises a start time of a period of the gate control list, a gate state of the gate control list, and at least two of a quantity of timeslots in each period of the gate control list, a length of the period of the gate control list, or a length of a timeslot of the gate control list.

23. The first network device of claim 20, wherein before the receiver receives the first talker attribute message, the receiver is further configured to receive, from a neighboring network device of the first network device, a medium access control (MAC) address request message to obtain a destination MAC address, wherein the first talker attribute message comprises the destination MAC address, wherein the destination MAC address is of the first network device, and wherein before the receiver receives the first talker attribute message, the transmitter is further configured to send, to the neighboring network device, a MAC address reply message comprising the destination MAC address.

24. The first network device of claim 23, wherein the listener attribute message comprises a port identifier of the listener device, and wherein the processor is further configured to determine the traffic scheduling information by:
   determining, based on the listener attribute message, that the listener device is capable of receiving the data stream;
   determining, based on the destination MAC address, that the first talker attribute message requests the first network device to allocate the traffic scheduling information; and
   determining, based on the first talker attribute message and the port identifier, the traffic scheduling information and the transmission path.

25. The first network device of claim 20, wherein the transmitter is further configured to forward the listener attribute message to the talker device.

26. A first network device in a fully distributed model using Time-Sensitive Networking (TSN), wherein the first network device comprises:
   a receiver configured to receive, from a second network device of a TSN network, a traffic scheduling message comprising traffic scheduling information, wherein the traffic scheduling information comprises time extension information indicating an extension time of currently effective traffic scheduling information before the traffic scheduling information takes effect, wherein the traffic scheduling information is based on a first talker attribute message and a listener attribute message, wherein the first talker attribute message requests the second network device to deliver the traffic scheduling information of a data stream, wherein the first talker attribute message indicates that a talker device is a transmitting end of the data stream, and wherein the listener attribute message indicates that a listener device is a receiving end of the data stream; and
   a processor coupled to the receiver and configured to:
      generate a gate control list based on the traffic scheduling information; and
      control, based on the gate control list, a state of a port for transmitting the data stream.

27. The first network device of claim 26, further comprising a transmitter coupled to the processor, wherein before the receiver receives the traffic scheduling message, the receiver is further configured to receive, from the talker device, a second talker attribute message requesting the listener device to receive the data stream, wherein the second talker attribute message comprises traffic scheduling enabling information and a destination medium access control (MAC) address of the listener device, wherein before the receiver receives the traffic scheduling message, the processor is further configured to skip reserving, based on the traffic scheduling enabling information, a resource for transmitting the data stream, and wherein before the receiver receives the traffic scheduling message, the transmitter is configured to forward the second talker attribute message to the listener device.

28. The first network device of claim 27, wherein the processor is further configured to generate the first talker attribute message based on the second talker attribute message, wherein a second payload of the second talker attribute message is the same as a first payload of the first talker attribute message, and wherein the transmitter is further configured to send the first talker attribute message to the second network device.

29. The first network device of claim 26, further comprising a transmitter coupled to the processor, wherein the first network device is the talker device, wherein before the receiver receives the traffic scheduling message, the transmitter is configured to:
    send, to the second network device, the first talker attribute message; and
    send, to the listener device, a second talker attribute message requesting the listener device to receive the data stream, wherein the second talker attribute message comprises traffic scheduling enabling information and a destination medium access control (MAC) address of the listener device, and
    wherein before the receiver receives the traffic scheduling message, the receiver is further configured to receive the listener attribute message from the second network device.

30. The first network device of claim 26, wherein the traffic scheduling information further comprises a start time of a period of the gate control list, a gate state of the gate control list, and at least two of a quantity of timeslots in each period of the gate control list, a length of the period of the gate control list, or a length of a timeslot of the gate control list.

* * * * *